US012651174B2

(12) United States Patent
Choi et al.

(10) Patent No.: US 12,651,174 B2
(45) Date of Patent: Jun. 9, 2026

(54) SYSTEM AND METHOD FOR MODIFYING KNOWLEDGE GRAPH FOR PROVIDING SERVICE

(71) Applicant: SAMSUNG ELECTRONICS CO., LTD., Suwon-si (KR)

(72) Inventors: Wonjong Choi, Suwon-si (KR); Soofeel Kim, Suwon-si (KR); Yewon Park, Suwon-si (KR); Jina Ham, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1069 days.

(21) Appl. No.: 17/599,973

(22) PCT Filed: Jul. 22, 2021

(86) PCT No.: PCT/KR2021/009511
§ 371 (c)(1),
(2) Date: Sep. 29, 2021

(87) PCT Pub. No.: WO2022/025527
PCT Pub. Date: Feb. 3, 2022

(65) Prior Publication Data
US 2023/0177356 A1     Jun. 8, 2023

(30) Foreign Application Priority Data

Jul. 29, 2020     (KR) ........................ 10-2020-0094686

(51) Int. Cl.
*G06N 5/022* (2023.01)

(52) U.S. Cl.
CPC .................................... *G06N 5/022* (2013.01)

(58) Field of Classification Search
CPC .......... G06N 5/022; G06N 5/04; G06N 20/00; G06N 5/02; G06N 3/08; G06N 3/006;
(Continued)

(56) References Cited

U.S. PATENT DOCUMENTS

| | | | |
|---|---|---|---|
| 8,055,675 | B2 | 11/2011 | Higgins et al. |
| 10,303,798 | B2 | 5/2019 | Stubley et al. |

(Continued)

FOREIGN PATENT DOCUMENTS

| | | |
|---|---|---|
| CN | 110275894 A | 9/2019 |
| JP | 3681710 B2 | 5/2005 |

(Continued)

OTHER PUBLICATIONS

An, et al., "Accurate Text-Enhanced Knowledge Graph Representation Learning", 2018, Proceedings of NAACL-HLT, Association for Computational Linguistics, 12 pages total.

(Continued)

*Primary Examiner* — Luis A Sitiriche
(74) *Attorney, Agent, or Firm* — Sughrue Mion, PLLC

(57) ABSTRACT

Provided is a system and method of modifying a knowledge graph for providing a service. A method, performed by a server, of modifying a knowledge graph for providing a service includes obtaining text related to an inquiry of a user; identifying a service related to an intention of the user by interpreting the text using at least one natural language understanding (NLU) model; obtaining a detailed knowledge graph related to the identified service; identifying at least one parameter indicating a constraint based on the intention of the user, based on a result of the interpreting; selecting a common knowledge graph related to a parameter representing the constraint from among a plurality of common knowledge graphs related to the identified service; extracting a first knowledge triple related to the parameter from the selected common knowledge graph; and modifying the detailed knowledge graph based on the extracted first knowledge triple.

16 Claims, 20 Drawing Sheets

(58) Field of Classification Search
CPC ........ G06N 3/044; G06N 3/045; G06N 5/025;
G06N 5/041; G06N 5/045; G06N 3/04;
G06N 3/042; G06N 3/0455; G06N 3/084;
G06N 3/098; G06N 5/027
See application file for complete search history.

(56) References Cited

U.S. PATENT DOCUMENTS

| | | | | |
|---|---|---|---|---|
| 10,733,619 | B1 * | 8/2020 | Newman | G06Q 30/0201 |
| 2018/0082183 | A1 * | 3/2018 | Hertz | G06Q 10/10 |
| 2019/0042988 | A1 * | 2/2019 | Brown | G06F 16/9535 |
| 2019/0057297 | A1 | 2/2019 | Barri et al. | |
| 2019/0236205 | A1 * | 8/2019 | Jia | G06F 16/3329 |
| 2019/0286644 | A1 | 9/2019 | Mohaideen et al. | |
| 2019/0287006 | A1 * | 9/2019 | Costabello | G06N 5/045 |
| 2019/0312869 | A1 * | 10/2019 | Han | G06F 21/64 |
| 2019/0354544 | A1 * | 11/2019 | Hertz | G06N 5/025 |
| 2020/0034465 | A1 | 1/2020 | Brake et al. | |
| 2020/0057946 | A1 * | 2/2020 | Singaraju | G06N 5/025 |
| 2020/0134477 | A1 | 4/2020 | Lee et al. | |
| 2020/0293874 | A1 * | 9/2020 | Ji | G06N 3/08 |
| 2021/0279606 | A1 * | 9/2021 | Srinivasan | G06N 5/04 |

FOREIGN PATENT DOCUMENTS

| | | |
|---|---|---|
| KR | 10-2019-0017619 A | 2/2019 |
| KR | 10-2020-0052448 A | 5/2020 |

OTHER PUBLICATIONS

Search Report (PCT/ISA/210) issued Oct. 26, 2021 by the International Searching Authority in International Patent Application No. PCT/KR2021/009511.

Written Opinion (PCT/ISA/237) issued Oct. 26, 2021 by the International Searching Authority in International Patent Application No. PCT/KR2021/009511.

"Ontology components," Wikipedia, (25 total pages), https://en.wikipedia.org/wiki/Ontology components (last edited Sep. 21, 2021).

* cited by examiner

FIG. 1

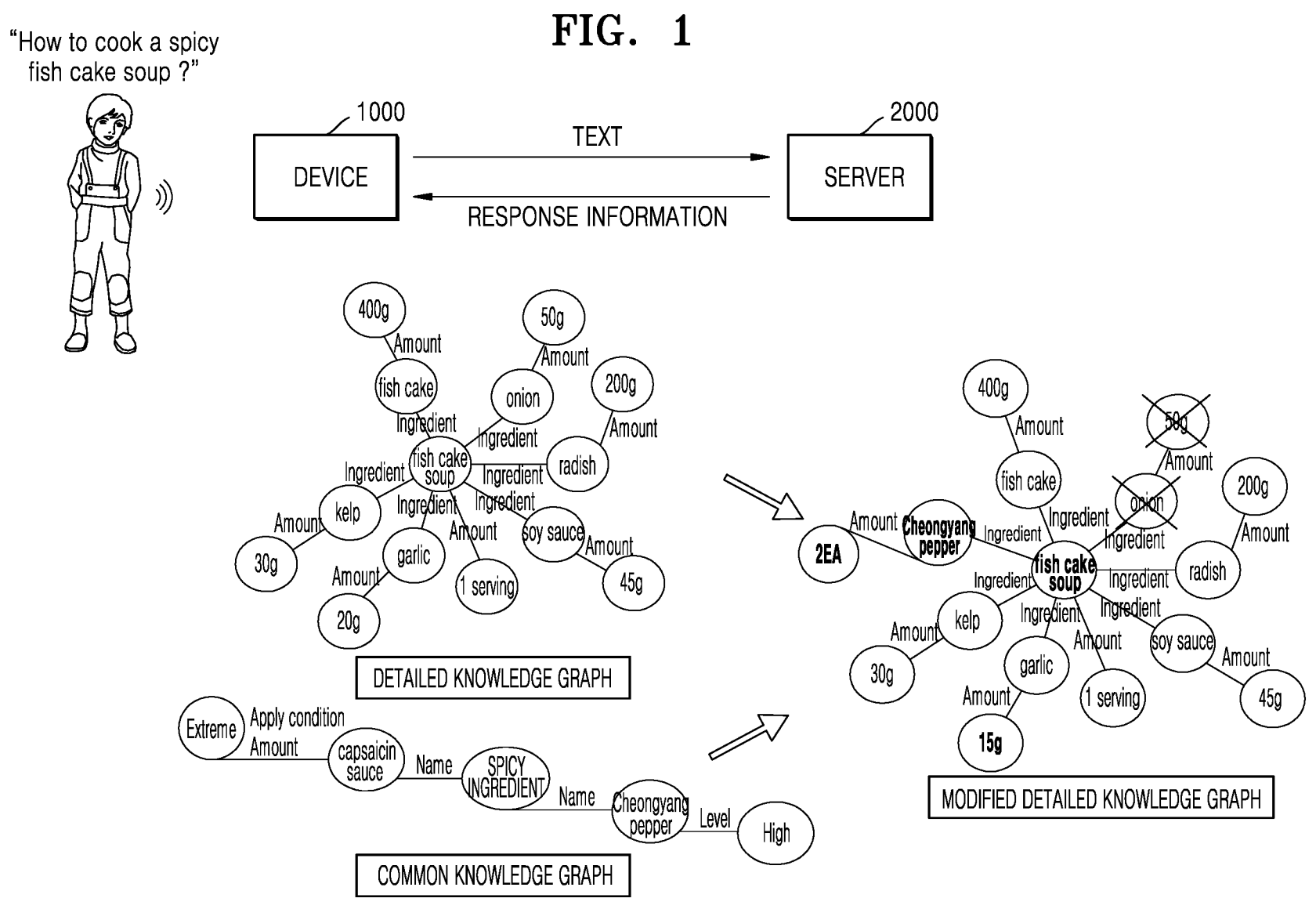

"How to cook a spicy fish cake soup ?"

DEVICE 1000

TEXT →

← RESPONSE INFORMATION

SERVER 2000

DETAILED KNOWLEDGE GRAPH fish cake soup
- Ingredient — onion — Amount — 50g
- Ingredient — onion — Amount — 200g
- Ingredient — radish — Amount
- Ingredient — soy sauce — Amount — 45g
- Ingredient — fish cake — Amount — 400g
- Ingredient — Amount — 1 serving
- Ingredient — garlic — Amount — 20g
- Ingredient — kelp — Amount — 30g

COMMON KNOWLEDGE GRAPH

SPICY INGREDIENT
- Name — Cheongyang pepper — Level — High
- Name — capsaicin sauce — Apply condition — Extreme
- Amount

MODIFIED DETAILED KNOWLEDGE GRAPH fish cake soup
- Ingredient — onion — Amount — 200g
- Ingredient — onion — Amount — 50g (crossed out)
- Ingredient — radish — Amount
- Ingredient — soy sauce — Amount — 45g
- Ingredient — fish cake — Amount — 400g
- Ingredient — Amount — 1 serving
- Ingredient — garlic — Amount — 15g
- Ingredient — kelp — Amount — 30g
- Ingredient — Cheongyang pepper — Amount — 2EA

FIG. 2

DETAILED KNOWLEDGE GRAPH
ABOUT FISH CAKE SOUP RECIPE

COMMON KNOWLEDGE GRAPH ABOUT
FOOD INGREDIENTS HAVING SPICY TASTE

COMMON KNOWLEDGE GRAPH ABOUT
FOOD INGREDIENTS HAVING SPICY TASTE

DETAILED KNOWLEDGE GRAPH
ABOUT FISH CAKE SOUP RECIPE

FIG. 4E

DETAILED KNOWLEDGE GRAPH ABOUT FISH CAKE SOUP RECIPE

COMMON KNOWLEDGE GRAPH ABOUT TASTES OF FOOD INGREDIENTS

DETAILED KNOWLEDGE GRAPH
ABOUT FISH CAKE SOUP RECIPE

COMMON KNOWLEDGE GRAPH ABOUT
FOOD INGREDIENTS HAVING SPICY TASTE

DETAILED KNOWLEDGE GRAPH
ABOUT FISH CAKE SOUP RECIPE

"Tell me a routine of lower body exercise to lose weight quickly" ⟹ lower body exercise provision<INTENT>
quickly<CONSTRAINT TYPE>
weight loss<CONSTRAINT>

DETAILED KNOWLEDGE GRAPH ABOUT
LOWER BODY EXERCISE FOR WEIGHT LOSS

FIG. 6B
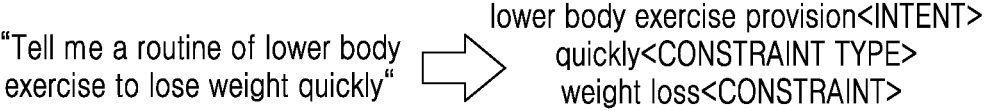
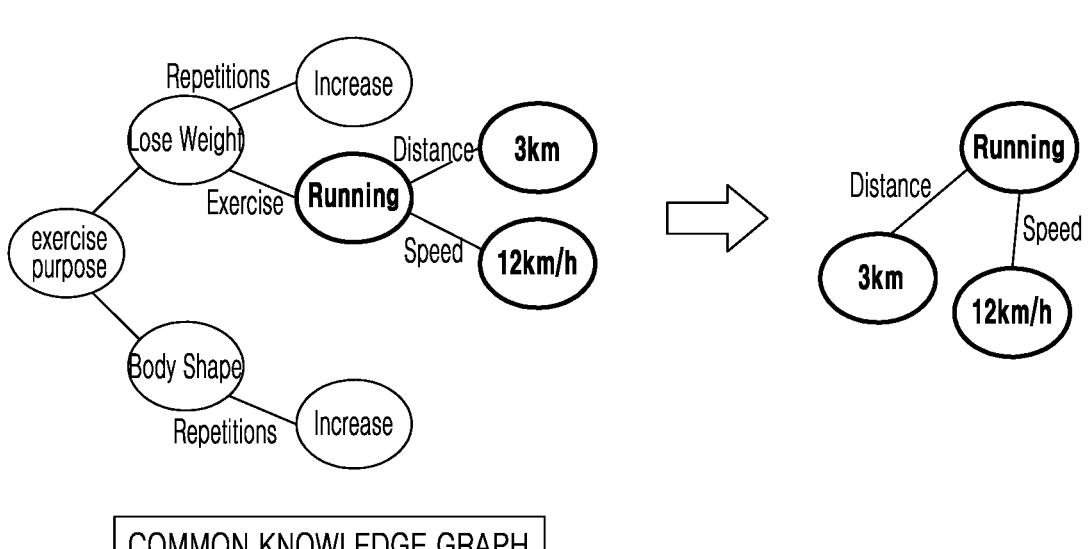
COMMON KNOWLEDGE GRAPH
ABOUT EXERCISE PURPOSE

FIG. 9

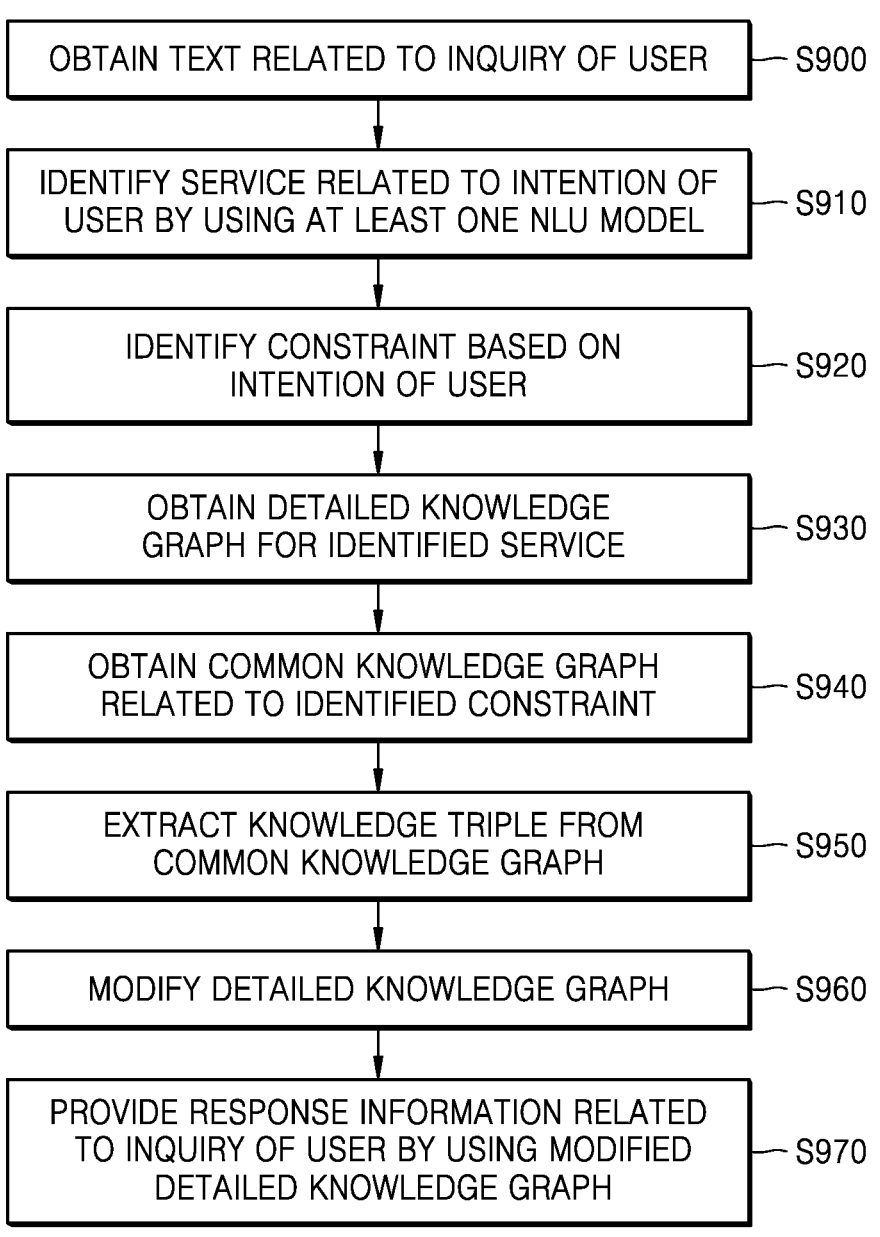

OBTAIN TEXT RELATED TO INQUIRY OF USER — S900

IDENTIFY SERVICE RELATED TO INTENTION OF USER BY USING AT LEAST ONE NLU MODEL — S910

IDENTIFY CONSTRAINT BASED ON INTENTION OF USER — S920

OBTAIN DETAILED KNOWLEDGE GRAPH FOR IDENTIFIED SERVICE — S930

OBTAIN COMMON KNOWLEDGE GRAPH RELATED TO IDENTIFIED CONSTRAINT — S940

EXTRACT KNOWLEDGE TRIPLE FROM COMMON KNOWLEDGE GRAPH — S950

MODIFY DETAILED KNOWLEDGE GRAPH — S960

PROVIDE RESPONSE INFORMATION RELATED TO INQUIRY OF USER BY USING MODIFIED DETAILED KNOWLEDGE GRAPH — S970

SYSTEM AND METHOD FOR MODIFYING KNOWLEDGE GRAPH FOR PROVIDING SERVICE

TECHNICAL FIELD

The disclosure relates to a system and method for modifying a knowledge graph for providing a service, and more particularly, to a system and method of modifying a knowledge graph about a service that is provided to a user, by taking into account a user's intention.

BACKGROUND ART

As networks and information processing technologies develop, various types of information may be collected and used to provide various services to users. In particular, a server that provides a service utilizes a knowledge graph for various categories in order to provide a more appropriate service to users. However, despite a large amount of data in the knowledge graph, it is difficult to effectively operate the knowledge graph in consideration of user's various intentions.

Accordingly, there is a need for a technology capable of effectively modifying a knowledge graph based on a user's various intentions and providing a specialized service to the user by using the modified knowledge graph, and there is also a need for a technique for reducing a delay caused due to information processing in providing a service to the user.

DESCRIPTION OF EMBODIMENTS

Technical Problem

Provided are a system and method for modifying a knowledge graph for providing a service, in which a detailed knowledge graph related to a user's intention may be modified by using a result of interpreting a text.

Provided are a system and method for modifying a knowledge graph for providing a service, in which a detailed knowledge graph may be modified by using a knowledge triple within a common knowledge graph.

Provided are a system and method for modifying a knowledge graph for providing a service, in which a detailed knowledge graph and a common knowledge graph of a service provided to a user may be modified according to a user's intention.

Solution to Problem

According to an embodiment of the disclosure, a method, performed by a server, of modifying a knowledge graph for providing a service includes obtaining text related to an inquiry of a user; identifying a service related to an intention of the user by interpreting the text using at least one natural language understanding (NLU) model; obtaining a detailed knowledge graph related to the identified service; identifying at least one parameter indicating a constraint based on the intention of the user, based on a result of the interpreting; selecting a common knowledge graph related to a parameter representing the constraint from among a plurality of common knowledge graphs related to the identified service; extracting a first knowledge triple related to the parameter from the selected common knowledge graph; and modifying the detailed knowledge graph based on the extracted first knowledge triple.

According to another embodiment of the disclosure, a server for modifying a knowledge graph for providing a service includes a communication interface; a storage storing one or more instructions; and a processor configured to execute the one or more instructions to obtain text related to an inquiry of a user, identify a service related to an intention of the user by interpreting the text using at least one natural language understanding (NLU) model, obtain a detailed knowledge graph related to the identified service, identify at least one parameter indicating a constraint based on the intention of the user, based on a result of the interpreting, select a common knowledge graph related to a parameter representing the constraint from among a plurality of common knowledge graphs related to the identified service, extract a first knowledge triple related to the parameter from the selected common knowledge graph, and modify the detailed knowledge graph based on the extracted first knowledge triple.

According to another embodiment of the disclosure, a non-transitory computer-readable recording medium has recorded thereon a computer program for performing the method on a computer.

BRIEF DESCRIPTION OF DRAWINGS

FIG. 1 is a schematic view of a system for modifying a knowledge graph for providing a service, according to an embodiment.

FIG. 2 is a block diagram of a server according to an embodiment.

FIG. 4E illustrates identification of a food ingredient related to a user's intention from the detailed knowledge graph about a fish cake soup recipe, according to an embodiment.

FIG. 6B illustrates a common knowledge graph about an exercise purpose, according to an embodiment.

FIG. 9 is a flowchart of a method, performed by a server, of modifying a detailed knowledge graph and providing a service related to an inquiry of a user, according to an embodiment.

MODE OF DISCLOSURE

Figure 3:
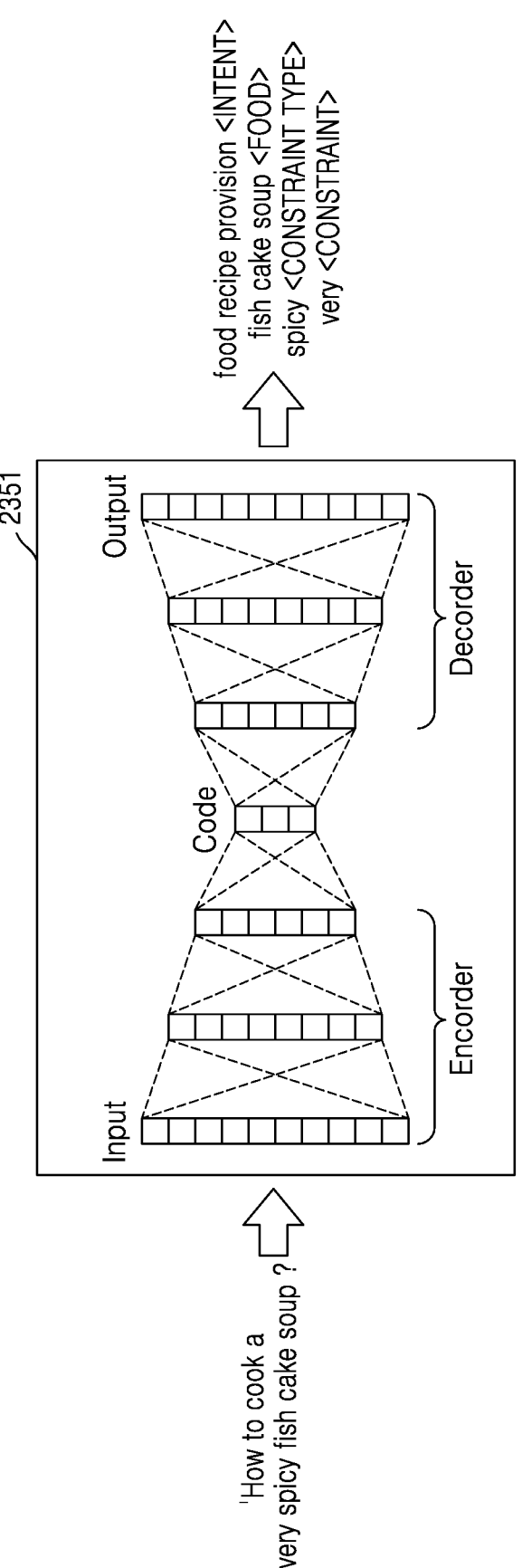
FIG. 3 illustrates interpretation of text by a text interpretation module, according to an embodiment.

Throughout the disclosure, the expression "at least one of a, b or c" indicates only a, only b, only c, both a and b, both a and c, both b and c, all of a, b, and c, or variations thereof.

Embodiments of the disclosure will now be described more fully with reference to the accompanying drawings such that one of ordinary skill in the art to which the disclosure pertains may easily execute the disclosure. The disclosure may, however, be embodied in many different forms and should not be construed as being limited to the embodiments set forth herein. In the drawings, parts irrelevant to the description are omitted for the simplicity of explanation, and like numbers refer to like elements throughout.

Throughout the specification, when an element is referred to as being "connected" or "coupled" to another element, it can be directly connected or coupled to the other element, or can be electrically connected or coupled to the other element with intervening elements interposed therebetween. The terms "comprises" and/or "comprising" or "includes" and/or "including" when used in this specification, specify the presence of stated elements, but do not preclude the presence or addition of one or more other elements.

As is traditional in the field, embodiments may be described and illustrated in terms of blocks which carry out a described function or functions. These blocks, which may be referred to herein as units or modules or the like, or by names such as processor, controller, device, or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

A knowledge graph may be a set of pieces of structured information including nodes and edges connecting nodes, and may be a knowledge base that structurally represents connection relationships between nodes. The knowledge graph may be generated by hierarchically expressing the nodes and relationships between the nodes, and may have a triple structure in which the nodes are connected through the edges. A node value corresponding to a node may represent an entity, and an edge value corresponding to an edge may represent a relationship or a property. The knowledge graph may be implemented in a language expressing an ontology, such as, for example, a Resource Description Framework (RDF), an RDF schema (RDF-S), and an Ontology Web Language (OWL), but is not limited thereto.

The knowledge graph may be used to provide a service to a user. The service may include, but is not limited to, for example, a food recipe providing service, an exercise management service, a broadcasting service, a content sharing service, a content providing service, a power management service, a game providing service, a chatting service, a document preparation service, a search service, a prior information provision service, a call service, a photo-taking service, a transportation recommendation service, and a video playback service.

A detailed knowledge graph may be a knowledge graph related to a detailed service according to a user's intention, and may be a knowledge graph corresponding to a service of a sub-category related to a specific intention of the user. In embodiments, a sub-category, which may be a narrower or more detailed category, may be referred to as a lower category. In embodiments, a category including the sub-category, which may be a broader or less detailed category, may be referred to as a higher category. For example, when a user wants to be provided with a recipe for a fish cake soup and there is a service of a lower category called 'Provision of a fish cake soup recipe' in a lower layer of a service of a higher category called 'Food Recipe Provision', a knowledge graph related to 'Provision of a fish cake soup recipe' may be identified as a detailed knowledge graph. For example, when a user wants to be provided with information for weight loss and there is a service of a lower category called 'exercise management for weight loss' in a lower layer of a service of a higher category called 'exercise management', a knowledge graph related to 'exercise management for eight loss' may be identified as a detailed knowledge graph.

A common knowledge graph may be a knowledge graph commonly related to detailed knowledge graphs, and may be a knowledge graph commonly related to services of a lower category corresponding to the detailed knowledge graphs. For example, a common knowledge graph about 'property of food ingredients' may be a knowledge graph commonly applicable to services of a lower category, such as 'Provision of a fish cake soup recipe', 'Provision of a hamburger recipe', and 'Provision of a bulgogi recipe'. For example, a common knowledge graph about 'exercise effect according to types of exercise' may be a knowledge graph commonly applicable to services of a lower category, such as 'exercise management for weight loss', 'exercise management for muscle mass increase', and 'exercise management for physical strength enhancement'.

The disclosure will now be described more fully with reference to the accompanying drawings.

FIG. 1 is a schematic view of a system for modifying a knowledge graph for providing a service, according to an embodiment of the disclosure.

Referring to FIG. 1, a server 2000 may receive a text related to an inquiry of a user from a device 100, and may provide the device 1000 with response information related to the inquiry of the user. The server 2000 may modify a detailed knowledge graph of a service associated with the inquiry of the user by taking into account an intention of the user, and may provide the service associated with the inquiry of the user by using the modified detailed knowledge graph.

The device 1000 may receive an inquiry input from the user and may transmit a text based on the inquiry input to the server 2000. The server 2000 may identify the intention of the user and a constraint related to the intention of the user by interpreting the text received from the device 1000, and may obtain and modify the detailed knowledge graph and a common knowledge graph, based on the identified intention and the identified constraint.

The server 2000 may change a node value or an edge value within the detailed knowledge graph, and may delete a node or edge within the detailed knowledge graph, in consideration of the identified intention and the identified constraint. The server 2000 may extract a knowledge triple from the common knowledge graph, and may add the extracted knowledge triple to a detailed knowledge triple. The server 2000 may modify the extracted knowledge triple, and may add the modified knowledge triple to the detailed knowledge graph.

The server 2000 may generate response information about the inquiry of the user by using the modified detailed knowledge graph, and may provide the generated response information to the device 1000.

The device 1000 and the server 2000 may be communicatively connected through a network, and the network may be implemented as a wired network such as a local area network (LAN), a wide area network (WAN), or a value added network (VAN), or as any type of wireless network such as a mobile radio communication network or a satellite communication network. The network may include a combination of at least two of a local area network (LAN), a wide area network (WAN), a value added network (VAN), a mobile radio communication network, or a satellite communication network, and may be a data communication network in a comprehensive sense that allows network constituents shown in FIG. 1 to communicate smoothly with each other, and includes a wired Internet, a wireless Internet, and a mobile wireless communication network.

The device 1000 may be, but is not limited to, a smartphone, a tablet PC, a PC, a smart TV, a mobile phone, a personal digital assistant (PDA), a laptop, a media player, a micro server, a global positioning system (GPS) device, an e-book terminal, a terminal for digital broadcasting, a navigation device, kiosk, an MP3 player, a digital camera, a home appliance, and other mobile or non-mobile computing devices. The device 1000 may be a wearable device such as a watch, glasses, a hair band, or a ring having a communication function and a data processing function. However, embodiments of the disclosure are not limited thereto, and the device 1000 may include any type of device capable of receiving an object from the server 2000 through a network and executing the object.

Figure 2:
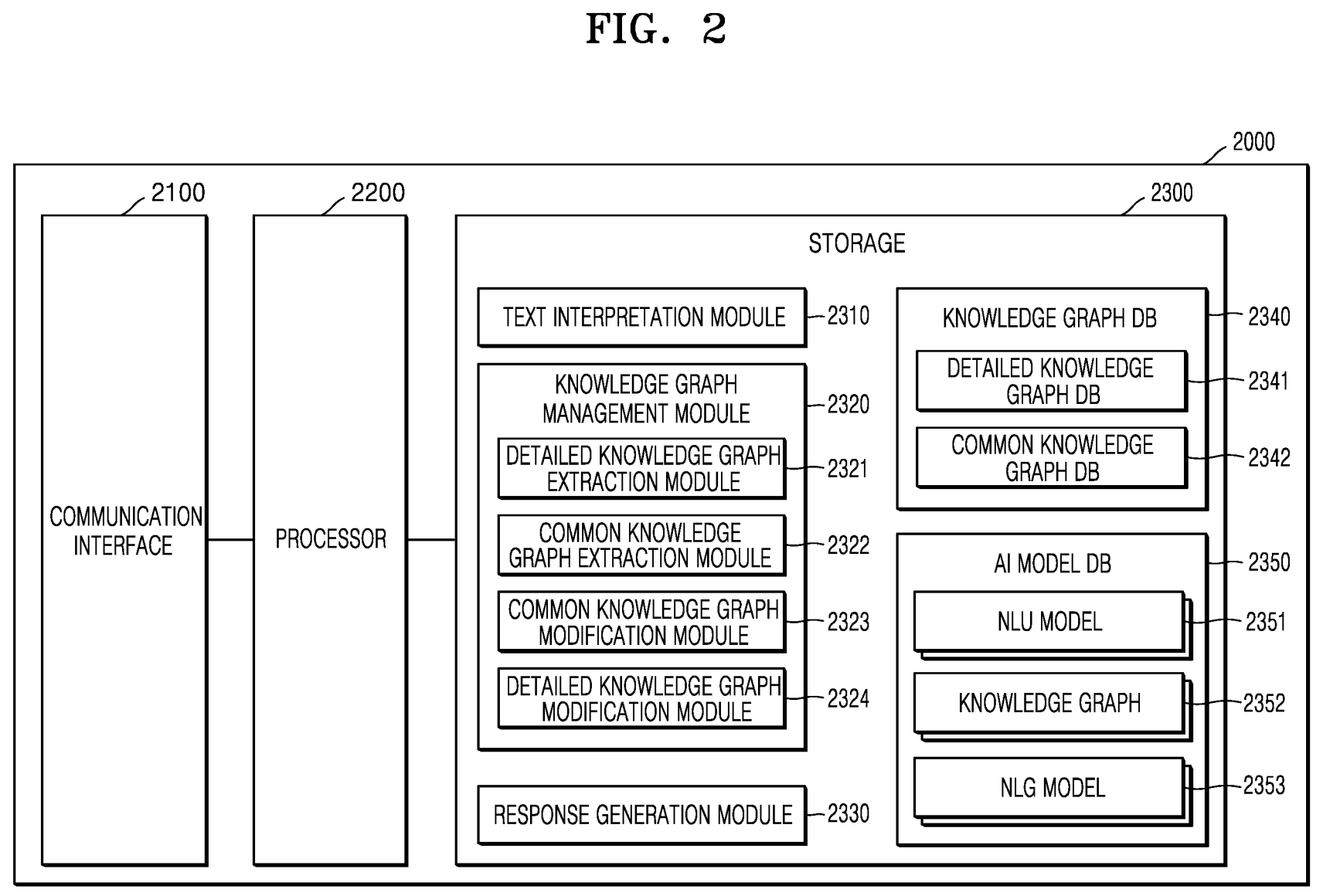

FIG. 2 is a block diagram of a server according to an embodiment of the disclosure.

Referring to FIG. 2, the server 2000 may include a communication interface 2100, a processor 2200, and a storage 2300.

The communication interface 2100 may include one or more components enabling communication between the device 1000 and other servers. For example, the communication interface 2100 may include a short-range wireless communication interface, a mobile communication interface, and a broadcasting receiver. The short-range wireless communication interface may include, but is not limited to, a Bluetooth communication interface, a Bluetooth Low Energy (BLE) communication interface, a Near Field Communication interface, a WLAN (Wi-Fi) communication interface, a Zigbee communication interface, an infrared Data Association (IrDA) communication interface, a Wi-Fi Direct (WFD) communication interface, an ultra wideband (UWB) communication interface, and an Ant+ communication interface. The mobile communication interface transmits or receives a wireless signal to or from at least one of a base station, an external terminal, or a server on a mobile communication network. The wireless signal may include various types of data according to transmission or reception of a voice call signal, a video call signal, or a text/multimedia message. The broadcast receiver receives a broadcast signal and/or broadcast-related information from an external source through a broadcast channel. The broadcast channel may include a satellite channel and a terrestrial channel.

The communication interface 2100 may transmit or receive necessary information to or from the device 1000 and other servers in order to modify a detailed knowledge graph about a service that is to be provided to a user of the device 1000.

The storage 2300 may store programs that are to be executed by the processor 2200 to be described later, and may store data input to or output from the server 2000.

The storage 2300 may include at least one type of storage medium from among a flash memory type storage medium, a hard disk type storage medium, a multimedia card micro type storage medium, a card type memory (for example, SD or XD memory), a random access memory (RAM), a static RAM (SRAM), a read-only memory (ROM), an electrically erasable programmable ROM (EEPROM), a programmable ROM (PROM), a magnetic memory, a magnetic disk, and an optical disk.

The programs stored in the storage 2300 may be classified into a plurality of modules according to their functions, for example, into a text interpretation module 2310, a knowledge graph management module 2320, and a response generation module 2330. The knowledge graph management module 2320 may include a detailed knowledge graph extraction module 2321, a common knowledge graph extraction module 2322, a common knowledge graph modification module 2323, and a detailed knowledge graph modification module 2324.

The storage 2300 may include a knowledge graph database (DB) 2340 and an artificial intelligence (AI) model DB 2350. The knowledge graph DB 2340 may include a detailed knowledge graph DB 2341 and a common knowledge graph DB 2342. The AI model DB 2350 may include at least one Natural Language Understanding (NLU) model 2351 at least one knowledge graph modification model 2352, and at least one Natural Language Generation (NLG) model 2353.

The processor 2200 controls overall operations of the server 2000. For example, the processor 2200 may control the communication interface 2100 and the storage 2300 by executing the programs stored in the storage 2300.

The processor 2200 may interpret the text received from the device 1000 by executing the text interpretation module 2310 stored in the storage 2300. The device 1000 may receive the inquiry input from the user and may transmit the text based on the inquiry input to the server 2000. The processor 2200 may input the text received from the device 1000 to the NLU model 2351 identify the intention of the user according to the text, based on a value output from the NLU model 2351, and may determine a service associated with the intention of the user. The processor 2200 may input the text received from the device 1000 to the NLU model 2351 and identify a constraint of the service associated with the intention of the user, based on the value output by the NLU model 2351.

The output value generated by the NLU model 2351 interpreting the text may include, for example, an intent and a parameter. The intent may be information determined by interpreting the text by using the NLU model 2351, and may represent, for example, the intention of the user. The intent may include not only intention information indicating the intention of the user, but also a numerical value corresponding to the intention information indicating the intention of the user. The numerical value may represent a probability that the text is associated with information indicating a particular intention. For example, when a plurality of pieces of information indicating the intention of the user are obtained as a result of interpreting the text by using the NLU model 2351, intention information having a maximum numerical value from among the plurality of pieces of intention information may be determined as the intent.

The parameter may indicate detailed information related to the intent. The parameter may be information related to the intent, and a plurality of types of parameters may correspond to one intent. For example, the NLU model 2351 may output a constraint and a constraint type that are parameters indicating a constraint for providing a service based on the intention of the user. For example, the processor 2200 may input a text 'How to cook a very spicy fish cake soup?' to the NLU mod& 2351, and an intent 'food recipe provision' may be output from the NLU mod& 2351, and parameters 'fish cake soup (FOOD)', 'spicy (CONSTRAINT TYPE)' and 'very (CONSTRAINT)' may be output from the NLU model 2351.

The processor 2200 may identify the intention of the user and the constraint by inputting the text to one NLU model 2351. In this case, an intent indicating the intention of the user and a constraint and a constraint type indicating a constraint related to the intention of the user may be output all together by the one NLU model 2351.

In embodiments, the processor 2200 may identify the intention of the user and the constraint by using a plurality of NLU models 2351. In this case, the processor 2200 may identify the intention of the user by inputting the text to the NLU model 2351 for ascertaining the intention of the user, and may identify a service based on the identified intention of the user. Thereafter, the processor 2200 may identify the constraint of the user by inputting the text to the NLU model 2351 related to the identified service.

The processor 2200 may prepare a knowledge graph for use in generating a response related to the text, by executing the knowledge graph management module 2320 stored in the storage 2300.

The processor 2200 may extract a detailed knowledge graph related to the intention of the user from among detailed knowledge graphs stored in the detailed knowledge graph DB 2341, by executing the detailed knowledge graph extraction module 2321. The detailed knowledge graph DB 2341 may store detailed knowledge graphs specialized for each type of service. A detailed knowledge graph may be a knowledge graph related to a detailed service according to a user's intention, and may be a knowledge graph corresponding to a service of a sub-category related to a specific intention of the user. For example, when a user wants to be provided with a recipe for a fish cake soup and there is a service of a lower category 'fish cake soup recipe provision' in a lower layer of a service of a higher category 'food recipe provision', a knowledge graph related to 'fish cake soup recipe provision' may be identified as a detailed knowledge graph. For example, when a user wants to be provided with information for weight loss and there is a service of a lower category 'exercise management for weight loss' in a lower layer of a service of a higher category 'exercise management', a knowledge graph related to the service 'exercise management for weight loss' may be identified as a detailed knowledge graph.

Detailed knowledge graphs corresponding to each detailed type of service may be pre-stored in the detailed knowledge graph DB 2341, and, for example, the detailed knowledge graphs may correspond to an intent, a parameter, and a service type that are output from an NLU.

For example, when an intent 'food recipe provision' and a parameter 'fish cake soup (FOOD)' are output from the text 'How to cook a very spicy fish cake soup?', the processor 2200 may extract a detailed knowledge graph corresponding to a service providing a fish cake soup recipe from the detailed knowledge graph DB 2341. For example, the processor 2200 may select a portion related to the intention of the user from among the nodes and the edges within the extracted detailed knowledge graph, and may use nodes and edges corresponding to the selected portion to achieve service provision. However, embodiments of the disclosure are not limited thereto.

The processor 2200 may extract a common knowledge graph related to the constraint from the common knowledge graph DB 2342, by executing the common knowledge graph extraction module 2322. A common knowledge graph may be a knowledge graph commonly related to detailed knowledge graphs, and may be a knowledge graph commonly related to the detailed knowledge graphs corresponding to services of a lower category. Common knowledge graphs related to the detailed knowledge graphs may be previously set and stored. For example, a knowledge graph about 'properly of food ingredients' may be a common knowledge graph commonly applicable to services of a lower category, such as 'fish cake soup recipe provision', 'hamburger recipe provision', and 'bulgogi recipe provision'. For example, a knowledge graph about 'exercise effect according to exercise type' may be a common knowledge graph commonly applicable to services of a lower category, such as 'exercise management for weight loss', 'exercise management for muscle mass increase', and 'exercise management for physical strength enhancement'.

The processor 2200 may extract a common knowledge graph by using a parameter indicating a constraint based on the intention of the user from among values output by the NLU model 2351. For example, when an intent 'food recipe provision' is output from the NLU model 2351 and parameters 'fish cake soup (FOOD)', 'spicy (CONSTRAINT TYPE)' and 'very (CONSTRAINT)' are output from the NLU model 2351 the processor 2200 may extract a common knowledge graph about 'food ingredients having a spicy taste' from the common knowledge graph DB 2342.

The processor 2200 may modify the common knowledge graph by using the common knowledge graph modification module 2323. The processor 2200 may extract a knowledge triple that is to be added to the detailed knowledge graph, from the common knowledge graph related to the constraint of the user. A knowledge triple may be a set of an edge and nodes connected to the edge within a knowledge graph. For example, when parameters indicating the constraint, 'spicy (CONSTRAINT TYPE)' and 'very (CONSTRAINT)', are output from the NLU model 2351, the processor 2200 may extract a knowledge triple including nodes corresponding to 'Cheongyang pepper' and '2EA/1 serving' and an edge connecting the nodes to each other from the common knowledge graph about 'food ingredients having a spicy taste'. In embodiments, the node '2EA/1 serving' connected to 'Cheongyang pepper' may indicate that 2 pieces of Cheongyang pepper may correspond to 1 serving. In this case, setup information indicating which part of the common knowledge graph is to be extracted according to the constraint may be pre-stored in the storage 2300. In embodiments, the knowledge graph modification model 2352, which may be an AI model trained with which part of the common knowledge graph is to be extracted according to the constraint, may be stored in the storage 2300, and the processor 2200 may extract the knowledge triple to be included in the detailed knowledge graph from the common knowledge graph by using the knowledge graph modification model 2352.

The processor 2200 may modify the extracted knowledge triple. The processor 2200 may modify at least one of node values corresponding to the nodes within the extracted knowledge triple, or an edge value corresponding to the edge within the extracted knowledge triple. In this case, the processor 2200 may modify the extracted knowledge triple by using the values output by the NLU model 2351 and the detailed knowledge graph. For example, when the user wants a recipe for cooking a fish cake soup for two people and the amount of food ingredient in a common knowledge graph about food ingredients for tastes is a value for one person, the processor 2200 may modify the common knowledge graph so that a value corresponding to the amount of food ingredient in the knowledge triple extracted from the common knowledge graph becomes a value corresponding to food ingredients for two people. For example, when the extracted knowledge triple includes node values 'Cheongyang pepper' and '2EA/1 serving' and an edge value 'amount', the processor 2200 may modify the node value '2EA/1 serving' within the extracted knowledge triple to '4EA'. In this case, setup information indicating which part of the common knowledge graph is to be modified and how to modify a part of the common knowledge graph may be pre-stored in the storage 2300. In embodiments, the knowledge graph modification mod& 2352, which may be an AI model trained with which part of the common knowledge graph is to be modified and how to modify a part of the common knowledge graph, may be stored in the storage 2300, and the processor 2200 may modify the common knowledge graph by using the knowledge graph modification model 2352.

Although it has been described above that the processor 2200 extracts a knowledge triple from the common knowledge graph and modifies the extracted knowledge triple, embodiments of the disclosure are not limited thereto. For example, the processor 2200 may provide an output value of the NLU model 2351, the detailed knowledge graph, and the common knowledge graph as inputs to the knowledge graph modification model 2352, and may obtain the modified knowledge triple output by the knowledge graph modification model 2352. For example, the processor 2200 may input, to the knowledge graph modification model 2352, the intent 'food recipe provision' and the parameters 'fish cake soup (FOOD)', 'spicy (CONSTRAINT TYPE)' and 'very (CONSTRAINT)' output by the NLU model 2351, the detailed knowledge graph about fish cake soup recipe provision, and the common knowledge graph about 'food ingredients having a spicy taste'. In this case, the knowledge graph modification model 2352 may be an AI model pre-trained to modify the common knowledge graph and extract a knowledge graph related to the intention of the user, and the knowledge graph modification model 2352 may output the modified knowledge triple including the node values 'Cheongyang pepper' and '4EA' and the edge value 'amount'.

The processor 2200 may modify the extracted detailed knowledge graph by using the detailed knowledge graph modification module 2324.

The processor 2200 may delete some of the knowledge triples within the detailed knowledge graph. The processor 2200 may delete, from the detailed knowledge graph, a knowledge triple that conflicts with the knowledge triple that is to be added. For example, the processor 2200 may identify whether the knowledge triple to be added conflicts with the knowledge triples within the detailed knowledge graph, by using the common knowledge graph representing the properties of food ingredients. For example, the processor 2200 may identify that 'Cheongyang pepper' within the knowledge triple including the node values 'Cheongyang pepper' and '2EA/1 serving' and the edge value 'amount' conflicts with 'onion' within the detailed knowledge graph. For example, the processor 2200 may delete a knowledge triple including 'onion', 'amount', and '50 g' within the detailed knowledge graph.

The processor 2200 may change values of some of the knowledge triples within the detailed knowledge graph. The processor 2200 may change a knowledge triple having the values of similar properties to the properties of the knowledge triple that is to be added. For example, the processor 2200 may identify whether the knowledge triple to be added is similar to the knowledge triples within the detailed knowledge graph, by using the common knowledge graph representing the properties of food ingredients. For example, the processor 2200 may identify that 'Cheongyang pepper' within the knowledge triple including the node values 'Cheongyang pepper' and '2EA/1 serving' and the edge value 'amount' has a similar property to 'garlic' within the detailed knowledge graph. The processor 2200 may change, to '15 g', '20 g' in a knowledge triple including 'garlic', 'amount', and '20 g' within the detailed knowledge graph.

In embodiments, the processor 2200 may change a knowledge triple having the values of properties conflicting with the properties of the knowledge triple that is to be added. For example, the processor 2200 may identify that 'Cheongyang pepper' within the knowledge triple including the node values 'Cheongyang pepper' and '2EA/1 serving' and the edge value 'amount' conflicts with 'onion' within the detailed knowledge graph, and may change, to '25 g', '50 g' in a knowledge triple including 'onion', 'amount', and '50 g' within the detailed knowledge graph.

The processor 2200 may change the node values within the detailed knowledge graph, by using the intention of the user interpreted by the NLU model 2351. For example, when the user wants a recipe for cooking a fish cake soup for two people and a detailed knowledge graph about a fish cake soup recipe includes values for cooking a fish cake soup for one person, the processor 2200 may change values indicating the amounts of ingredients within the detailed knowledge graph about a fish cake soup recipe to values corresponding to cooking for two people.

Although it has been described above that the processor 2200 identifies a knowledge triple that conflicts with or is similar to a to-be-added knowledge triple from the detailed knowledge graph and deletes or changes the identified knowledge triple, embodiments of the disclosure are not limited thereto. For example, the processor 2200 may provide an output value of the NLU model 2351, the detailed knowledge graph, and the common knowledge graph as inputs to the knowledge graph modification model 2352, and may obtain a changed detailed knowledge graph output by the knowledge graph modification model 2352. For example, the processor 2200 may input, to the knowledge graph modification model 2352, the intent 'food recipe provision' and the parameters 'fish cake soup (FOOD)', 'spicy (CONSTRAINT TYPE)' and 'very (CONSTRAINT)' output by the NLU model 2351, the detailed knowledge graph about fish cake soup recipe provision, and the common knowledge graph about 'food ingredients having a spicy taste', In this case, the knowledge graph modification model 2352 may be an AI model pre-trained to change the values within the detailed knowledge graph.

The processor 2200 may add the knowledge triple extracted from the common knowledge graph to the changed detailed knowledge graph.

Although it has been described that the processor 2200 extracts a knowledge triple from the common knowledge graph, changes the detailed knowledge graph, and adds the extracted knowledge triple to the changed detailed knowledge graph, embodiments of the disclosure are not limited thereto. For example, the processor 2200 may provide an output value of the NLU model 2351, the detailed knowledge graph, and the common knowledge graph as inputs to the knowledge graph modification model 2352, and may obtain, from the knowledge graph modification model 2352, a detailed knowledge graph modified through addition of the knowledge triple of the common knowledge graph.

The processor 2200 may generate response information related to the received text by executing the response generation module 2330. The processor 2200 may generate a response message for the user, by using the modified detailed knowledge graph and the NLG model 2353. The processor 2200 may obtain a response content that is to be provided to the user, such as text, an image, or a moving picture.

The processor 2200 may provide the generated response message to the device 1000. In embodiments, the processor 2200 may provide the modified detailed knowledge graph to the device 1000, and allow the device 1000 to respond to the input of the user by using the modified detailed knowledge graph.

FIG. 3 illustrates interpretation of the text by the text interpretation module 2310, according to an embodiment of the disclosure.

Referring to FIG. 3, the text interpretation module 2310 may input the text received from the device 1000 to the NLU model 2351, and may obtain values output by the NLU model 2351. The NLU model 2351 may be an AI model including a plurality of network layers, and may output data representing the meaning of the text. The data output by the NLU model 2351 interpreting the text may include, for example, an intent and a parameter. The intent may be information determined by interpreting the text by using the NLU model 2351 and may represent, for example, the intention of the user. The parameter may indicate detailed information related to the intent. The parameter may be information related to the intent, and a plurality of types of parameters may correspond to one intent.

The NLU model 2351 may output an intent indicating the intention of the user and constraints related to the intention of the user. For example, when a text 'How to cook a very spicy fish cake soup?' is input to the NLU model 2351, and an intent 'food recipe provision' and parameters 'fish cake soup (FOOD)', 'spicy (CONSTRAINT TYPE)' and 'very (CONSTRAINT)' may be output from the NLU model 2351.

FIGS. 4A through 4F are views for explaining an example in which a detailed knowledge graph is modified, according to an embodiment of the disclosure.

Figure 4A:
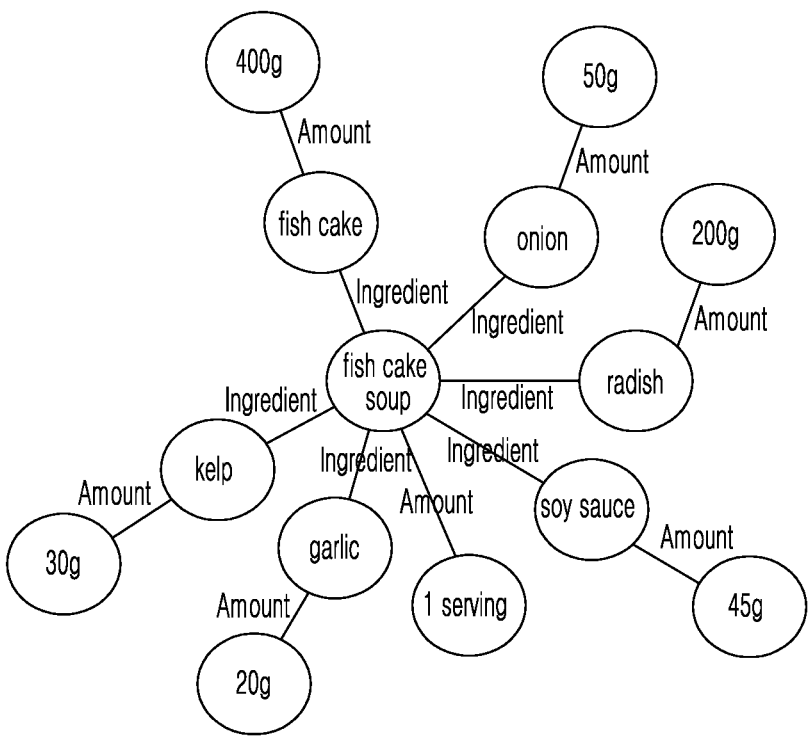
FIG. 4A illustrates a detailed knowledge graph about a fish cake soup recipe, according to an embodiment.

FIG. 4A illustrates a detailed knowledge graph about a fish cake soup recipe, according to an embodiment of the disclosure.

Referring to FIG. 4A, for example, when an intent 'fish cake soup recipe provision' is output from the NLU model 2351, a detailed knowledge graph related to a fish cake soup recipe as shown in FIG. 4A may be called or obtained from the detailed knowledge graph DB 2341.

For example, in the detailed knowledge graph about a fish cake soup recipe, a node 'fish cake', a node 'onion', a node 'radish', a node 'soy sauce', a node 'garlic', and a node 'kelp' may each be connected to a node 'fish cake soup', having a relationship of 'ingredient'. A node '1 serving' may be connected to the node 'fish cake soup', having a relationship of 'amount'. In embodiments, when two nodes are described as having a relationship, this may mean that they are connected by an edge. For example, the node '1 serving' being connected to the node 'fish cake soup' having a relationship of 'amount' may mean that the node '1 serving' is connected to the node 'fish cake soup' by the edge 'amount'.

For example, nodes representing the respective amounts of ingredients may be connected to the node 'fish cake', the node 'onion', the node 'radish', the node 'soy sauce', the node 'garlic', and the node 'kelp', respectively.

Figure 4B:
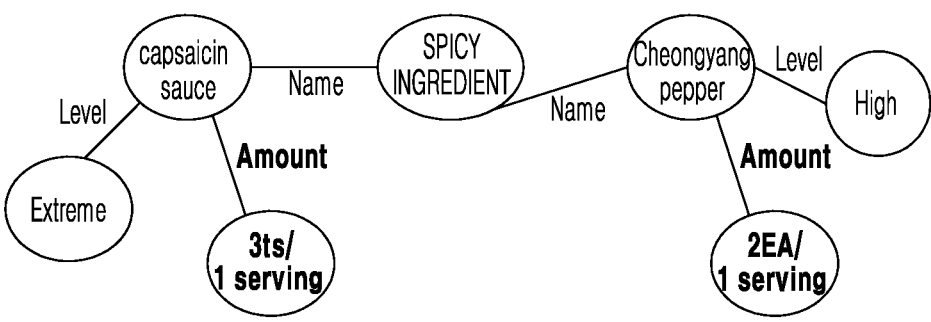
FIG. 4B illustrates a common knowledge graph about food ingredients having a spicy taste, according to an embodiment.

FIG. 4B illustrates a common knowledge graph about food ingredients having a spicy taste, according to an embodiment of the disclosure.

Referring to FIG. 4B, for example, when parameters representing constraints 'spicy (CONSTRAINT TYPE)' and 'very (CONSTRAINT)' are output by the NLU model 2351, a common knowledge graph about 'food ingredients having a spicy taste' as shown in FIG. 4B may be called or obtained from the common knowledge graph DB 2342.

For example, in the common knowledge graph about 'food ingredients having a spicy taste', a node 'capsaicin sauce' and a node 'Cheongyang pepper' may be connected to a node 'spicy ingredient', having a relationship of 'name'. For example, a node 'Extreme' may be connected to the node 'capsaicin sauce' in a relationship of 'level' and a node '3 ts/1 serving' may be connected to the node 'capsaicin sauce' in a relationship of 'amount'. For example, a node 'High' may be connected to the node 'Cheongyang pepper' in a relationship of 'level', and a node '2EA/1 serving' may be connected to the node 'Cheongyang pepper' in a relationship of 'amount'.

Figure 4C:
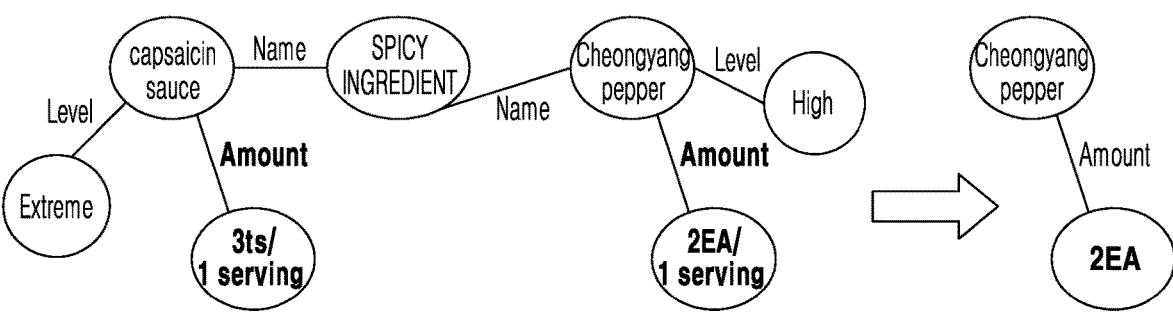
FIG. 4C illustrates extraction of a knowledge triple related to a spicy taste from a common knowledge graph about food ingredients having a spicy taste, according to an embodiment.

FIG. 4C illustrates extraction of a knowledge triple related to a spicy taste from a common knowledge graph about food ingredients having a spicy taste, according to an embodiment of the disclosure.

Referring to FIG. 4C, the server 2000 may extract a knowledge triple including the node 'Cheongyang pepper', the node '2EA/1 serving', and the edge 'amount' from the common knowledge graph about 'food ingredients having a spicy taste'. In this case, setup information about which part of the common knowledge graph is to be extracted according to the intent and the parameters output by the NLU model 2351 may be pre-stored in the storage 2300. For example, when the parameters indicating constraints 'spicy (CONSTRAINT TYPE)' and 'very (CONSTRAINT)' are output from the NLU model 2351, the server 2000 may extract the knowledge triple including the node 'Cheong-yang pepper', the node '2EA/1 serving' and the edge 'amount', which may be a knowledge triple related to 'spicy (CONSTRAINT TYPE)' and 'very (CONSTRAINT)', according to the setup information pre-stored in the storage 2300. In this case, the server 2000 may previously obtain information about food ingredients preferred by the user or food ingredients the user has, and may extract a knowledge triple by using the previously obtained information.

In embodiments, the server 2000 may extract, from the common knowledge graph, a knowledge triple that is to be included in a detailed knowledge graph, by using the knowledge graph modification model 2352, which may be an AI model trained with which part of the common knowledge graph is to be extracted according to the intent and parameters output by the NLU model 2351. For example, the server 2000 may provide output values which are output by the NLU model 2351, the detailed knowledge graph about fish cake soup recipe provision, and the common knowledge graph about food ingredients having a spicy taste as inputs to the knowledge graph modification model 2352, and may obtain the knowledge triple output by the knowledge graph modification model 2352.

Figure 4D:
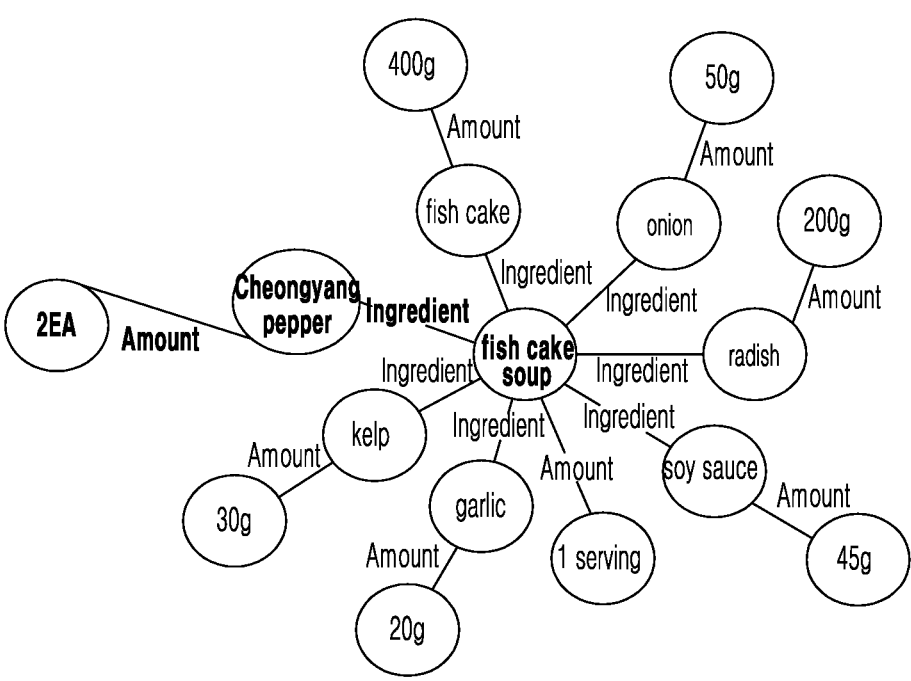
FIG. 4D illustrates addition of an extracted knowledge triple to a detailed knowledge graph about a fish cake soup recipe, according to an embodiment.

FIG. 4D illustrates addition of an extracted knowledge triple to a detailed knowledge graph about a fish cake soup recipe, according to an embodiment of the disclosure.

Referring to FIG. 4D, for example, the node 'Cheongyang pepper' of the knowledge triple including the node 'Cheon-gyang pepper', the node '2EA/1 serving', and the edge 'amount' may be connected to the node 'fish cake soup' of the detailed knowledge graph about a fish cake soup recipe. In this case, the node 'Cheongyang pepper' may be connected to the node 'fish cake soup' through the edge 'ingredient'.

Figure 4E:
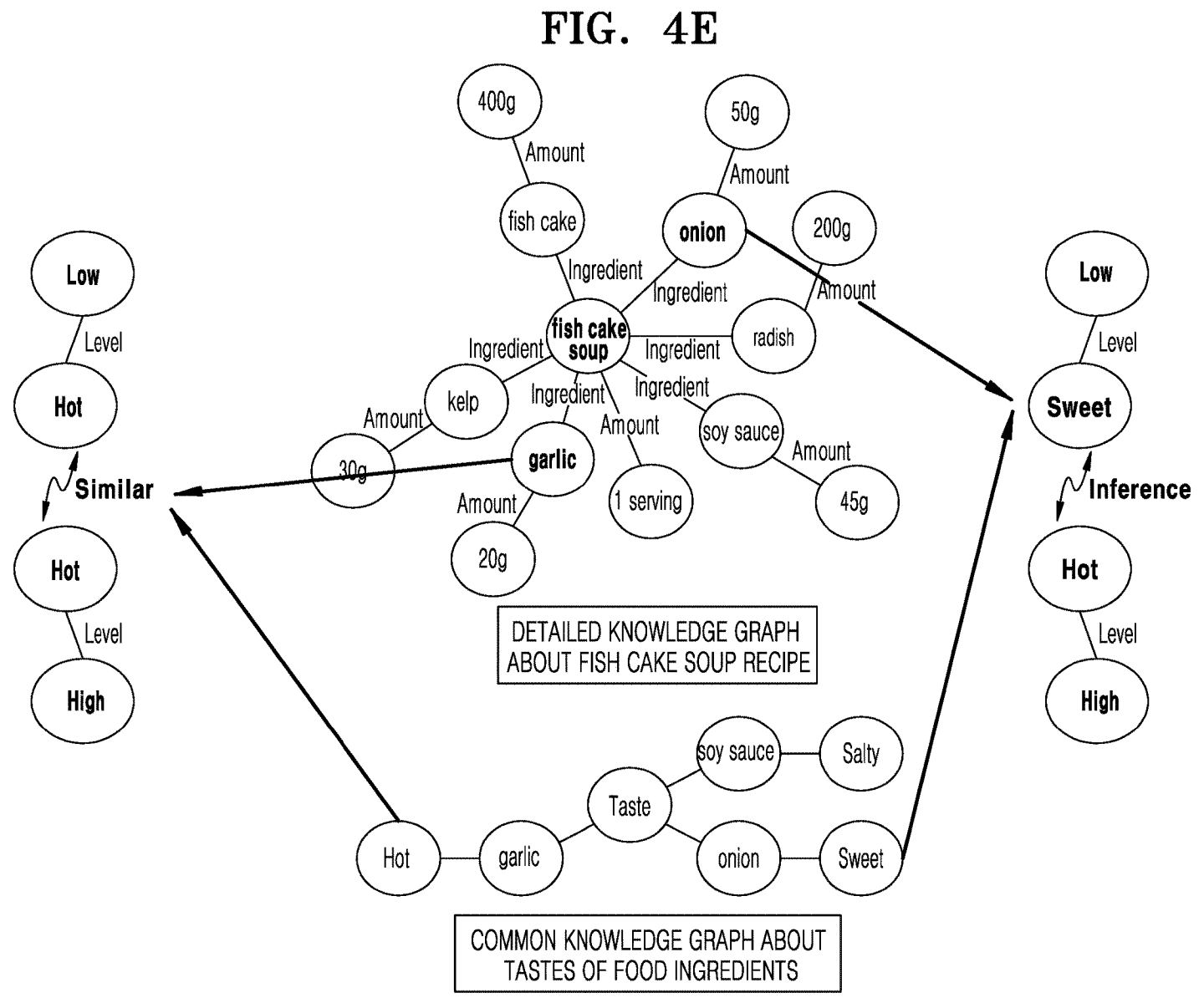

FIG. 4E illustrates identification of a food ingredient related to the intention of the user from the detailed knowledge graph about a fish cake soup recipe, according to an embodiment of the disclosure.

Referring to FIG. 4E, for example, when the intent 'food recipe provision' and the parameters 'fish cake soup (FOOD)', 'spicy (CONSTRAINT TYPE)', and 'very (CONSTRAINT)' are output from the NLU model 2351, the server 2000 may identify a food ingredient conflicting with the intention of the user from the detailed knowledge graph about a fish cake soup recipe, by using a common knowledge graph about the tastes of food ingredients.

For example, the server 2000 may identify the tastes of food ingredients within the detailed knowledge graph about a fish cake soup recipe and may identify a food ingredient conflicting with the parameters 'spicy (CONSTRAINT TYPE)' and 'very (CONSTRAINT)', by using the common knowledge graph about the tastes of food ingredients. The server 2000 may identify that the taste of onion conflicts with the parameters 'spicy (CONSTRAINT TYPE)' and 'very (CONSTRAINT)'.

For example, when the intent 'food recipe provision' and the parameters 'fish cake soup (FOOD)', 'spicy (CON-STRAINT TYPE)', and 'very (CONSTRAINT)' are output from the NLU model 2351, the server 2000 may identify a food ingredient similar to the intention of the user from the detailed knowledge graph about a fish cake soup recipe, by using the common knowledge graph about the tastes of food ingredients.

For example, the server 2000 may identify the tastes of food ingredients within the detailed knowledge graph about a fish cake soup recipe and may identify the food ingredient similar to the parameters 'spicy (CONSTRAINT TYPE)' and 'very (CONSTRAINT)', by using the common knowl-edge graph about the tastes of food ingredients. The server 2000 may identify that the taste of garlic is similar to the parameters 'spicy (CONSTRAINT TYPE?' and 'very (CONSTRAINT)'.

Figure 4F:
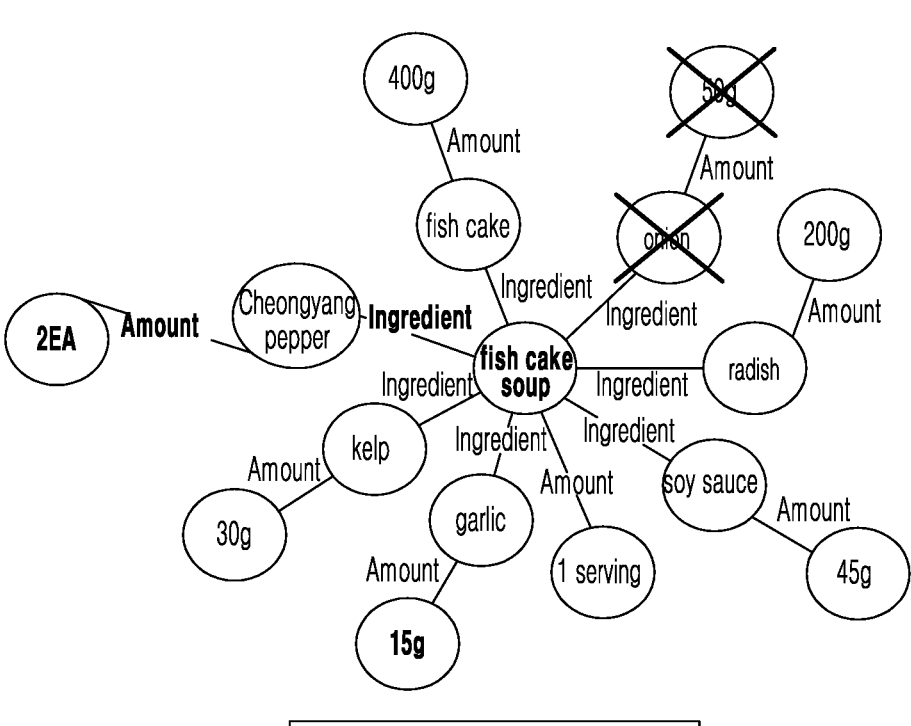
FIG. 4F illustrates modification of nodes within the detailed knowledge graph about a fish cake soup recipe, according to an embodiment.

FIG. 4F illustrates modification of nodes within the detailed knowledge graph about a fish cake soup recipe, according to an embodiment of the disclosure.

Referring to FIG. 4F, the server 2000 may connect a knowledge triple including the node 'Cheongyang pepper', the edge 'amount', and the node '2 ea' to the node 'fish cake soup' within the detailed knowledge graph about a fish cake soup recipe. The server 2000 may delete a knowledge triple including the node 'onion', the edge 'amount', and the node '2 ea', which may be a knowledge triple conflicting with the intention of the user, from the detailed knowledge graph about a fish cake soup recipe. The server 2000 may change, to a node '15 g', a node '20 g' within a knowledge triple including the node 'garlic', the edge 'amount', and the node '20 g', which may be a knowledge triple similar to the intention of the user.

Although FIGS. 4E and 4F illustrate an example in which the server 2000 identifies a node related to the intention of the user from the detailed knowledge graph about a fish cake soup recipe and then changes the identified node, embodi-ments of the disclosure are not limited thereto. For example, the server 2000 may input, to the knowledge graph modi-fication model 2352, the output value of the NLU model 2351, the detailed knowledge graph about a fish cake soup recipe, the common knowledge graph about the food ingre-dients having a spicy taste, and the common knowledge graph about the tastes of food ingredients. In this case, the server 2000 may obtain a modified detailed knowledge graph of FIG. 4F through a value output by the knowledge graph modification model 2352.

Figure 5A:
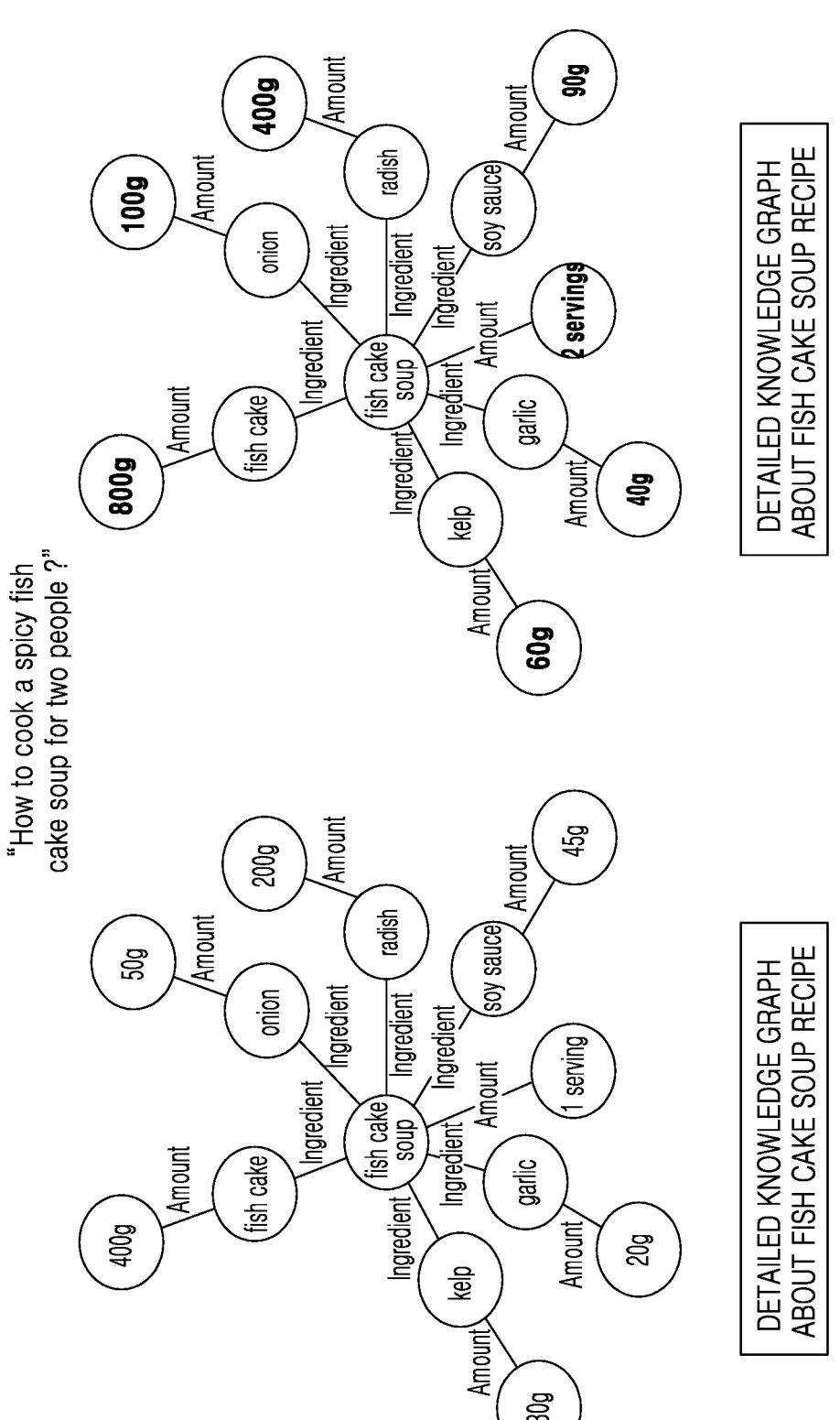
FIG. 5A illustrates changing of the values of the nodes within a detailed knowledge graph, according to a user's intention, according to an embodiment.
Figure 5B:
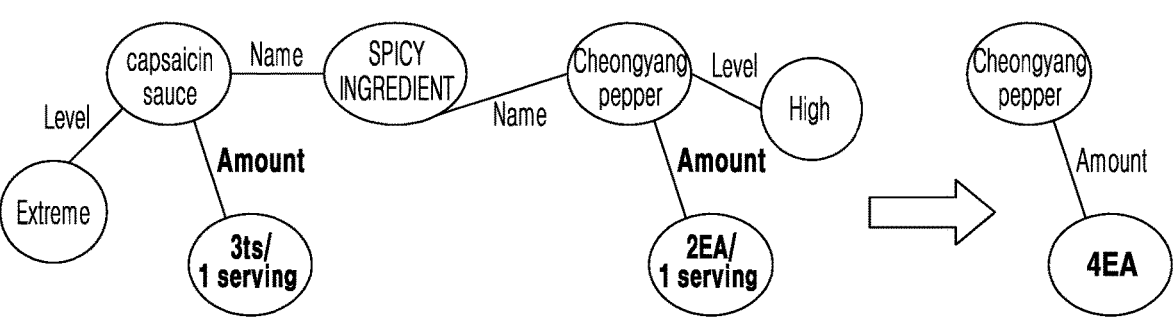
FIG. 5B illustrates changing of the values of the nodes within a knowledge triple extracted from a common knowledge graph, according to a user's intention, according to an embodiment.
Figure 5C:
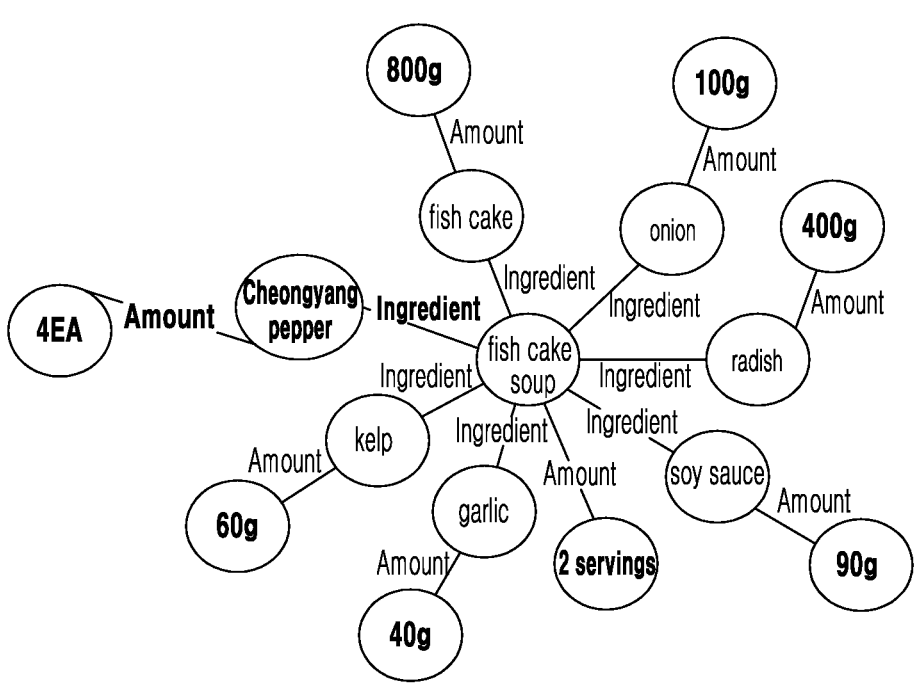
FIG. 5C illustrates an example of a detailed knowledge graph modified by using a common knowledge graph of which the values of nodes have been changed and a knowledge triple of which the values of nodes have been changed, according to an embodiment.

FIGS. 5A through 5C illustrate an example of changing values of the nodes within a detailed knowledge graph and values of the nodes within a knowledge triple extracted from a common knowledge graph and modifying the detailed knowledge graph, according to the intention of the user, according to an embodiment of the disclosure.

FIG. 5A illustrates changing of the values of the nodes within a detailed knowledge graph, according to the inten-tion of the user, according to an embodiment of the disclo-sure.

Referring to FIG. 5A, for example, when a text "How to make a spicy fish cake soup for two people?" is received from the user, the server 2000 may change the value of a node indicating the amount of food and the values of nodes indicating the respective amounts of food ingredients in the detailed knowledge graph about a fish cake soup recipe. The server 2000 may change, for example, a node '1 serving' indicating the amount of fish cake soup to a node '2 servings'. The server 2000 may also change, for example, a node '30 g', a node '20 g', a node '45 g', a node '200 g', a node '50 g', and a node '400 g', indicating the amounts of food ingredients of a fish cake soup, for example by dou-bling the amounts in a manner corresponding to the doubling of the serving size. For example, the server 2000 may change the node '30 g' to a node '60 g', may change the node '20 g' to a node '40 g', may change the node '45 g' to a node '90 g', may change the node '200 g' to a node '400 g', may change the node '50 g' to a node '100 g', and may change the node '400 g' to a node '800 g', respectively.

FIG. 5B illustrates changing of the values of the nodes within a knowledge triple extracted from a common knowledge graph, according to the intention of the user, according to an embodiment of the disclosure.

Referring to FIG. 5B, for example, when a text "How to make a spicy fish cake soup for two people?" is received from the user, the server 2000 may extract a knowledge triple including the node 'Cheongyang pepper', the edge 'amount', and the node '2 ea/1 serving' from the common knowledge graph about food ingredients having a spicy taste. The server 2000 may change a node '2 ea/1 serving' to a node '4 ea' within the knowledge triple including the node 'Cheongyang pepper', the edge 'amount', and the node '2 ea/1 serving'.

FIG. 5C illustrates an example of a detailed knowledge graph modified by using a common knowledge graph of which the values of nodes have been changed and a knowledge triple of which the values of nodes have been changed, according to an embodiment of the disclosure.

Referring to FIG. 5C, the knowledge triple of which the values of nodes have changed in FIG. 5B may be connected to the detailed knowledge graph of which the values of nodes have changed in FIG. 5A FIGS. 6A through 6C are views illustrating modification of a detailed knowledge graph about a lower body exercise, according to an embodiment of the disclosure.

Figure 6A:
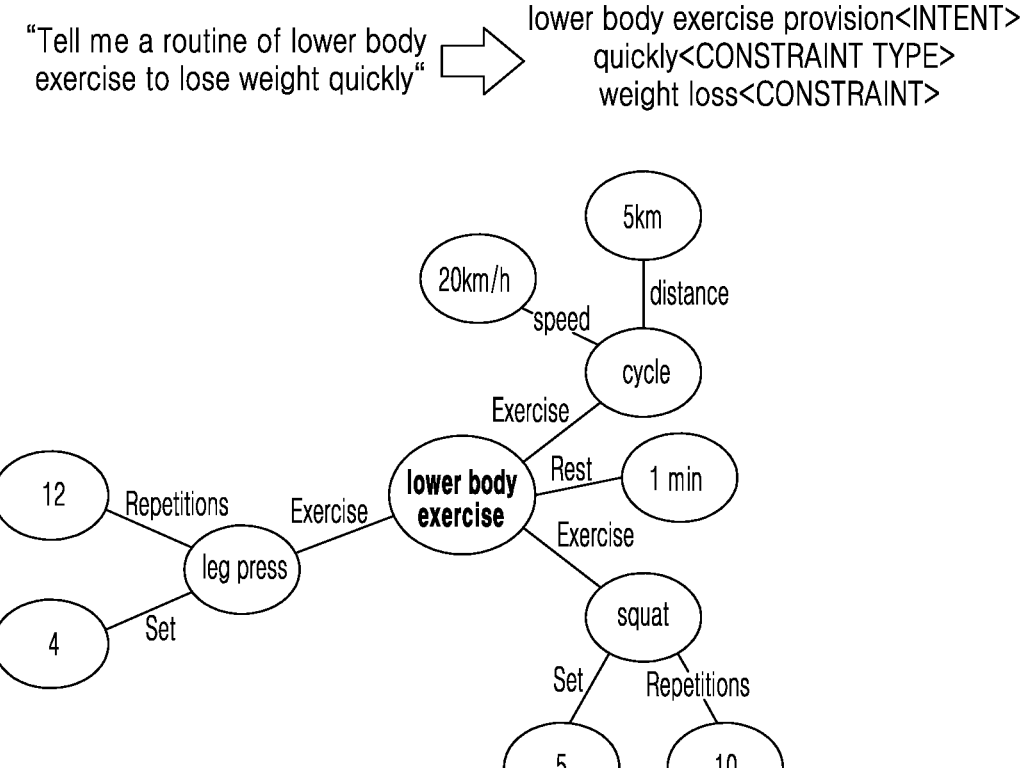
FIG. 6A illustrates a detailed knowledge graph about a lower body exercise, according to an embodiment.

FIG. 6A illustrates a detailed knowledge graph about a lower body exercise, according to an embodiment of the disclosure.

Referring to FIG. 6A, for example, when an intent 'lower body exercise' is output from a text 'Tell me a routine of lower body exercise to lose weight quickly' by the NLU model 2351, the detailed knowledge graph about a lower body exercise of FIG. 6A may be called or obtained from the detailed knowledge graph DB 2341.

For example, in the detailed knowledge graph about a lower body exercise, a node 'cycle' a node 'leg press', and a node 'squat' may be connected to a node 'lower body exercise', having a relationship of 'exercise'. A node '1 min' may be connected to the node 'lower body exercise' in a relationship of 'rest'.

For example, a node '20 km/h' may be connected to the node 'cycle' in a relationship of 'speed', and a node '5 km' may be connected to the node 'cycle' in a relationship of 'distance'. For example, a node '12' may be connected to the node 'leg press' in a relationship of 'repetitions', and a node '4' may be connected to the node 'leg press' in a relationship of 'set'. For example, a node '10' may be connected to the node 'squat' in a relationship of 'repetitions', and a node '5' may be connected to the node 'squat' in a relationship of 'set'.

FIG. 6B illustrates a common knowledge graph about an exercise purpose, according to an embodiment of the disclosure.

Referring to FIG. 6B, for example, when parameters representing constraints 'quickly (CONSTRAINT TYPE)' and 'weight loss (CONSTRAINT)' are output by the NLU model 2351, the common knowledge graph about an exercise purpose of FIG. 6B may be called or obtained from the common knowledge graph DB 2342.

For example, a knowledge triple including a node 'Running', a node '3 km', and an edge 'distance' and a knowledge triple including a node 'Running', node '12 km/h', and an edge 'speed' may be extracted from the common knowledge graph about an exercise purpose. The node 'Running' may be common to the extracted knowledge triples. In this case, setup information about which part of the common knowledge graph is to be extracted according to the intent and parameters output by the NLU model 2351 may be pre-stored in the storage 2300. For example, when the parameters indicating constraints 'quickly (CONSTRAINT TYPE)' and 'weight loss (CONSTRAINT)' are output by the NLU model 2351, the server 2000 may extract knowledge triples related to 'quickly (CONSTRAINT TYPE)' and 'weight loss (CONSTRAINT)' according to the setup information pre-stored in the storage 2300. In this case, the server 2000 may previously obtain information about exercise types preferred by the user and may extract a knowledge triple by using the previously obtained information about exercise types.

In embodiments, the server 2000 may extract, from the common knowledge graph, a knowledge triple that is to be included in a detailed knowledge graph, by using the knowledge graph modification model 2352, which may be an AI model trained with which part of the common knowledge graph is to be extracted according to the intent and parameters output by the NLU model 2351. For example, the server 2000 may provide output values which are output by the NLU model 2351, the detailed knowledge graph about a lower body exercise, and the common knowledge graph about an exercise purpose as inputs to the knowledge graph modification model 2352, and may obtain the knowledge triple output by the knowledge graph modification model 2352.

Figure 6C:
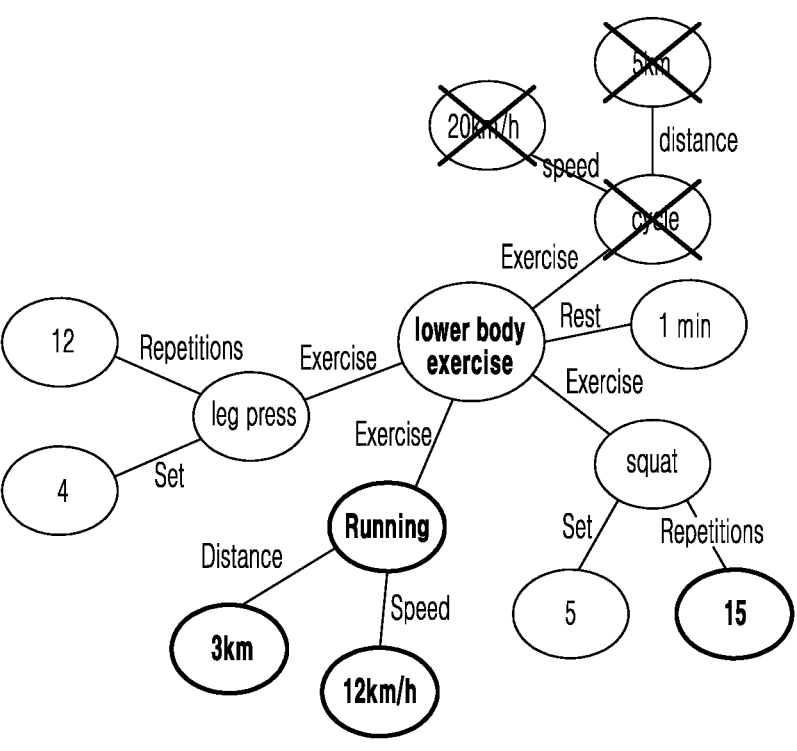
FIG. 6C illustrates modification of a detailed knowledge graph about a lower body exercise, according to an embodiment.

FIG. 6C illustrates modification of a detailed knowledge graph about a lower body exercise, according to an embodiment of the disclosure.

Referring to FIG. 6C, the server 2000 may connect the knowledge triple including a node 'Running', a node 3 k and an edge 'distance' and the knowledge triple including a node 'Running', a node '12 km/h', and an edge 'speed' to the node 'lower body exercise' within the detailed knowledge graph about a lower body exercise. The server 2000 may change the node '10' connected to the node 'squat' in a relationship of 'repetitions' to a node '15' according to the intention of the user. The server 2000 may delete knowledge triples including the node 'cycle' that have similar properties to a knowledge triple including the node 'Running'.

Although FIGS. 6B and 6C illustrate an example in which the server 2000 identifies a node related to the intention of the user from the detailed knowledge graph about a lower body exercise and then changes the identified node, embodiments of the disclosure are not limited thereto. For example, the server 2000 may input, to the knowledge graph modification model 2352, the output value of the NLU model 2351, the detailed knowledge graph about a lower body exercise, and the common knowledge graph about an exercise purpose. In this case, the server 2000 may obtain a modified detailed knowledge graph of FIG. 6C through a value output by the knowledge graph modification model 2352.

Figure 7A:
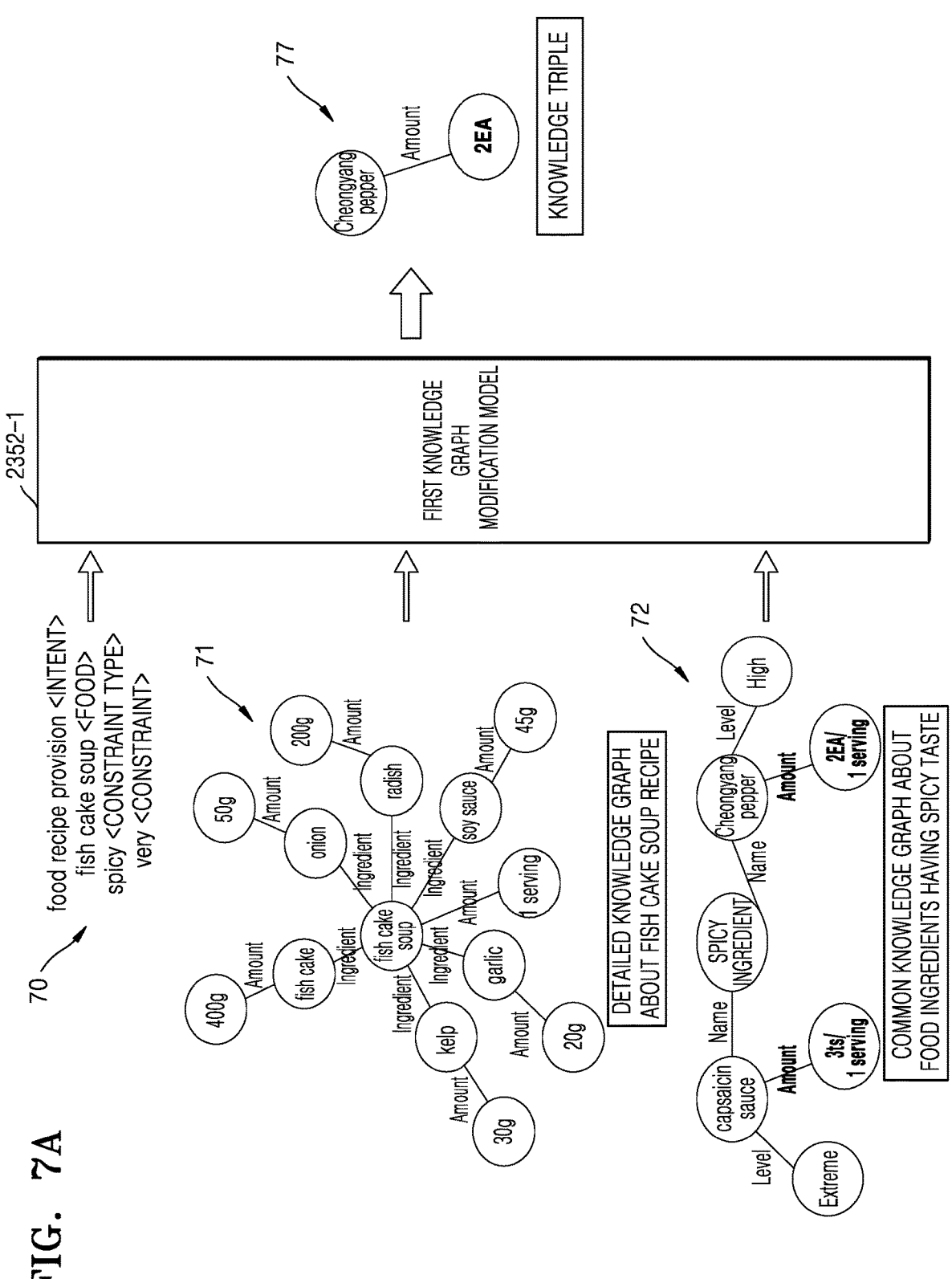
FIG. 7A is a view illustrating obtainment of a knowledge triple to be added to a detailed knowledge graph by using a knowledge graph modification model, according to an embodiment.
Figure 7B:
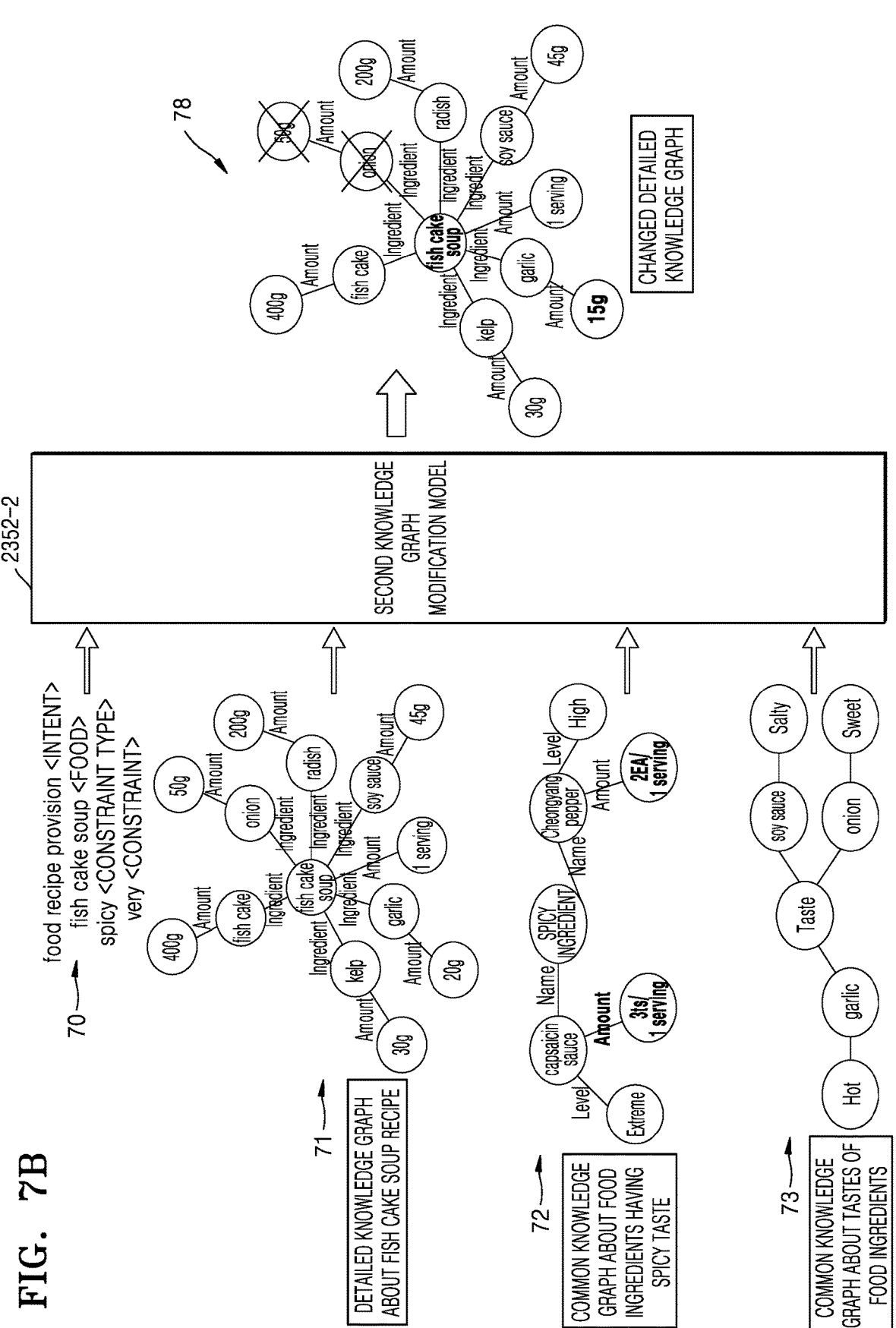
FIG. 7B is a view illustrating a change in a node value and an edge value within a detailed knowledge graph by using a knowledge graph modification model, according to an embodiment.
Figure 7C:
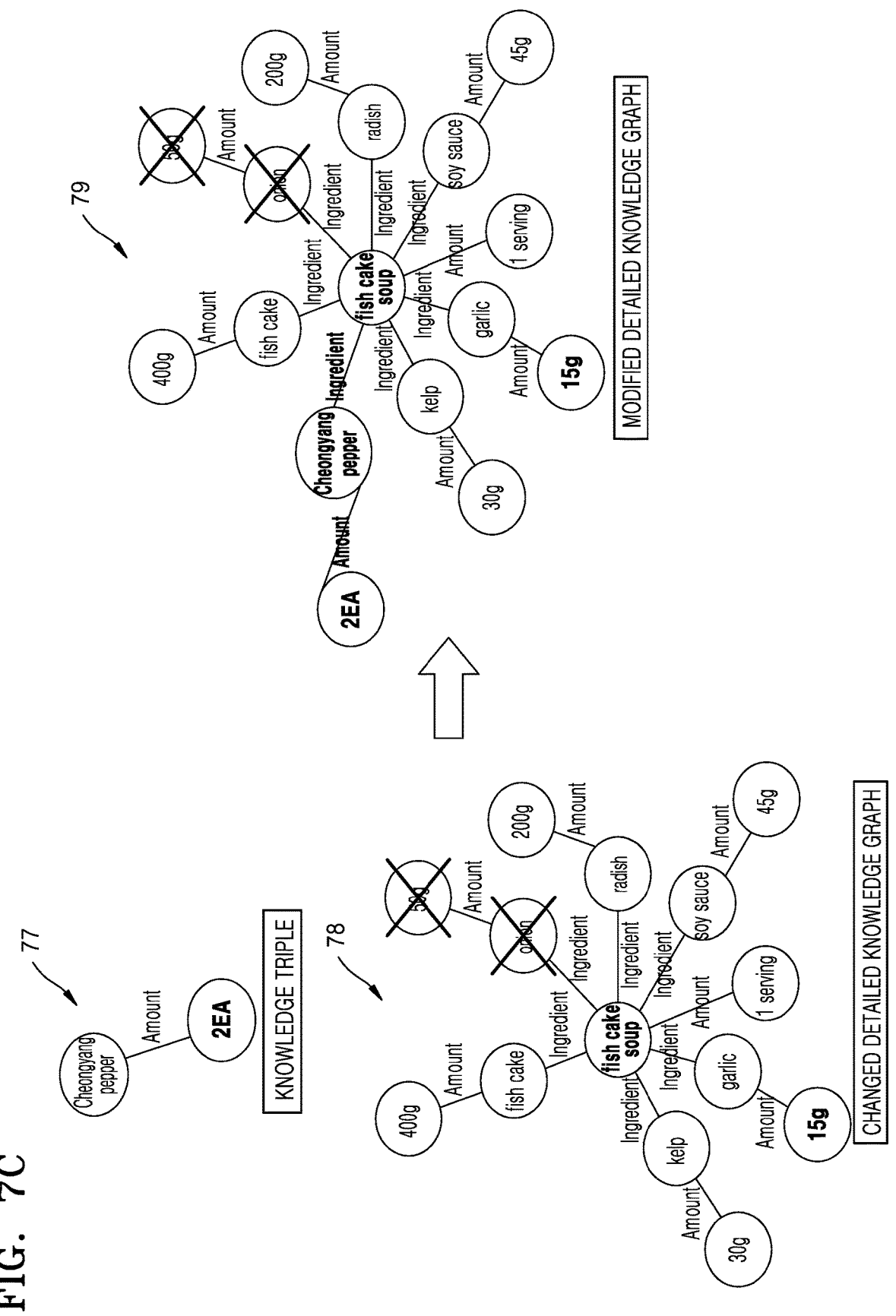
FIG. 7C is a view illustrating modification of a detailed knowledge graph, based on an extracted knowledge triple and a changed detailed knowledge graph, according to an embodiment.

FIGS. 7A through 7C are views illustrating modification of a detailed knowledge graph by using a knowledge graph modification model, according to an embodiment of the disclosure.

FIG. 7A is a view illustrating obtainment of a knowledge triple to be added to a detailed knowledge graph by using a knowledge graph modification model, according to an embodiment of the disclosure.

Referring to FIG. 7A, the server 2000 may obtain a knowledge triple 77 that is to be added to a detailed knowledge graph 71 about a fish cake soup recipe, from a common knowledge graph 72 about food ingredients having a spicy taste, by using a first knowledge graph modification model 2352-1. The server 2000 may provide output data 70 that is output by the NLU model 2351, the detailed knowledge graph 71 about a fish cake soup recipe, and the common knowledge graph 72 about food ingredients having a spicy taste as inputs to the first knowledge graph modification model 2352-1, and may obtain a knowledge triple 77 output by the first knowledge graph modification model 2352-1. Although it has been described above with reference to FIG. 7A that the knowledge triple 77 is extracted from the common knowledge graph 72 about food ingredients having a spicy taste, embodiments of the disclosure are not limited thereto. The knowledge triple 77 may be modified and extracted from the common knowledge graph 72. In this case, the first knowledge graph modification model 2352-1 may be an AI model pre-trained to modify and extract a knowledge triple from a common knowledge graph.

FIG. 7B is a view illustrating a change in a node value and an edge value within a detailed knowledge graph by using a knowledge graph modification model, according to an embodiment of the disclosure.

Referring to FIG. 78, the server 2000 may obtain a detailed knowledge graph 78 of which node values or edge values have been changed from the detailed knowledge graph 71 about a fish cake soup recipe, by using a second knowledge graph modification model 2352-2. The server 2000 may provide the output data 70 which is output by the NLU model 2351, the detailed knowledge graph 71 about a fish cake soup recipe, and the common knowledge graph 72 about food ingredients having a spicy taste as inputs to the second knowledge graph modification model 2352-2, and may obtain the changed detailed knowledge graph 78 output by the second knowledge graph modification model 2352-2. In this case, the second knowledge graph modification model 2352-2 may be an AI model pre-trained to change the node values and edge values within the common knowledge graph.

FIG. 7C is a view illustrating modification of a detailed knowledge graph, based on an extracted knowledge triple and a changed detailed knowledge graph, according to an embodiment of the disclosure.

Referring to FIG. 7C, the server 2000 may obtain a modified detailed knowledge graph 79 by combining the knowledge triple 77 obtained by the first knowledge graph modification model 2352-1 with the changed detailed knowledge graph 78 obtained by the second knowledge graph modification model 2352-2. For example, the server 2000 may connect the node 'Cheongyang pepper' of the knowledge triple 77 obtained by the first knowledge graph modification model 2352-1 to the node 'fish cake soup' within the changed detailed knowledge graph 78 obtained by the second knowledge graph modification model 2352-2.

Figure 8:
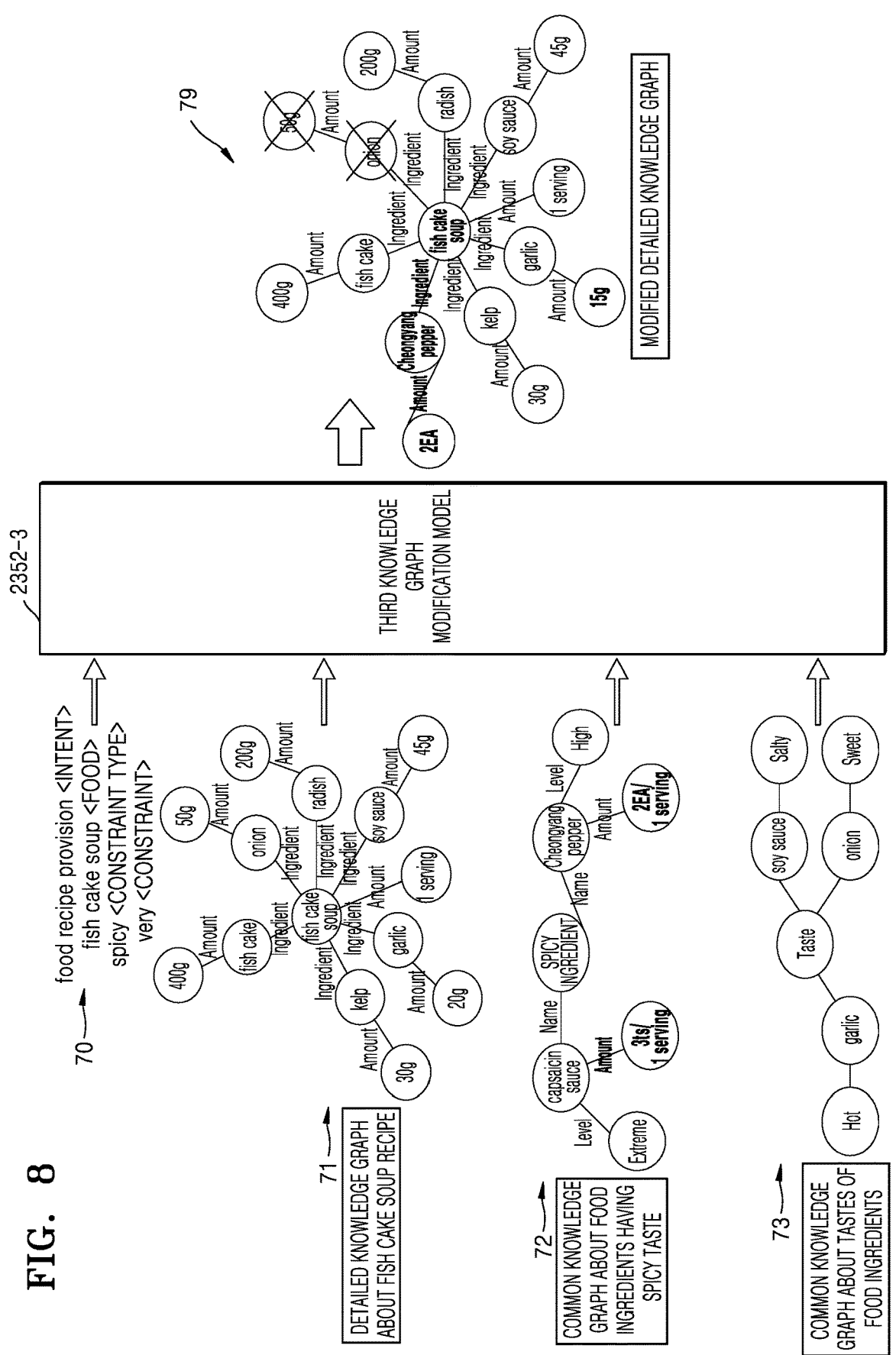
FIG. 8 is a view illustrating modification of a detailed knowledge graph by using a knowledge graph modification model, according to an embodiment.

FIG. 8 is a view illustrating modification of a detailed knowledge graph by using a knowledge graph modification model, according to an embodiment of the disclosure.

Referring to FIG. 8, the server 2000 may modify the detailed knowledge graph 71 about a fish cake soup recipe, by using a third knowledge graph modification model 2352-3. The server 2000 may provide the output data 70 which is output by the NLU model 2351, the detailed knowledge graph 71 about a fish cake soup recipe, the common knowledge graph 72 about food ingredients having a spicy taste, and a common knowledge graph 73 about the tastes of food ingredients as inputs to the third knowledge graph modification model 2352-3, and may obtain a modified detailed knowledge graph 79 output by the third knowledge graph modification model 2352-3. In this case, the third knowledge graph modification mod& 2352-3 may be an AI model pre-trained to modify a common knowledge graph.

FIG. 9 is a flowchart of a method, performed by the server 2000, of modifying a detailed knowledge graph and providing a service related to an inquiry of a user, according to an embodiment of the disclosure.

In operation S900, the server 2000 may obtain a text related to the inquiry of the user. The device 1000 may receive the inquiry input from the user and may transmit the text based on the inquiry input to the server 2000, and the server 2000 may receive the text from the device 1000.

In operation S910, the server 2000 may identify a service related to an intention of the user by using the at least one NLU model 2351. The server 2000 may input the text received from the device 1000 to the NLU model 2351 identify the intention of the user according to the text, based on a value output from the NLU model 2351, and may determine the service related to the intention of the user. An output value generated by the NLU model 2351 interpreting the text may include, for example, an intent representing the intention of the user, and the server 2000 may identify a service corresponding to the intent as the service related to the intention of the user.

In operation S920, the server 2000 may identify a constraint based on the intention of the user. The server 2000 may input the text received from the device 1000 to the NLU model 2351, and identify a constraint of the service associated with the intention of the user, based on the value output by the NLU model 2351. An output value generated by the NLU model 2351 interpreting the text may include a parameter representing the constraint associated with the intention of the user, and the server 2000 may identify the constraint associated with the intention of the user, based on the parameter.

The server 2000 may identify the intention of the user and the constraint by inputting the text to one NLU model 2351. In this case, an intent indicating the intention of the user and a constraint and a constraint type indicating a constraint related to the intention of the user may be output all together by the one NLU model 2351.

In embodiments, the server 2000 may identify the intention of the user and the constraint by using a plurality of NLU models 2351. In this case, the processor 2200 may identify the intention of the user by inputting the text to an NLU model for ascertaining the intention of the user, and may identify the service based on the identified intention of the user. Thereafter, the server 2000 may identify the constraint of the user by inputting the text to the NLU model related to the identified service.

In operation S930, the server 2000 may obtain a detailed knowledge graph for the identified service. The server 2000 may extract a detailed knowledge graph corresponding to the identified service from among detailed knowledge graphs stored in the detailed knowledge graph DB 2341. The detailed knowledge graph DB 2341 may store detailed knowledge graphs specialized for each type of service. For example, the detailed knowledge graph may correspond to an intent, a parameter, and a service type that are output by an NLU. For example, when an intent 'food recipe provision' and a parameter 'fish cake soup (FOOD)' are output from the text 'How to cook a very spicy fish cake soup?', the processor 2200 may extract a detailed knowledge graph corresponding to a service providing a fish cake soup recipe from the detailed knowledge graph DB 2341. For example, the server 2000 may select a portion related to the intention of the user from among the nodes and the edges within the extracted detailed knowledge graph, and may use nodes and edges corresponding to the selected portion to provide a service. However, embodiments of the disclosure are not limited thereto.

In operation S940, the server 2000 may obtain a common knowledge graph related to the identified constraint. The server 2000 may extract a common knowledge graph related to the constraint from the common knowledge graph DB 2342. The server 2000 may extract a common knowledge graph by using a parameter indicating a constraint based on the intention of the user from among values output by the NLU model 2351. For example, when an intent 'food recipe provision' is output from the NLU model 2351 and parameters 'fish cake soup (FOOD)', 'spicy (CONSTRAINT TYPE)' and 'very (CONSTRAINT)' are output from the NLU model 2351, the processor 2200 may extract a common knowledge graph about 'food ingredients having a spicy taste' from the common knowledge graph DB 2342.

In operation S950, the server 2000 may extract a knowledge triple from the common knowledge graph. The server 2000 may extract a knowledge triple that is to be added to the detailed knowledge graph, from the common knowledge graph related to the constraint of the user. For example, when parameters indicating the constraints 'spicy (CONSTRAINT TYRE)' and 'very (CONSTRAINT)' are output by the NLU model 2351, the server 2000 may extract a knowledge triple including nodes corresponding to 'Cheongyang pepper' and '2EA/1 serving' and an edge connecting the nodes to each other from the common knowledge graph about 'food ingredients having a spicy taste'. In this case, setup information about which part of the common knowledge graph is to be extracted according to the constraint may be pre-stored in the storage 2300. In embodiments, the knowledge graph modification model 2352, which may be an AI model trained with which part of the common knowledge graph is to be extracted according to the constraint, may be stored in the storage 2300, and the server 2000 may extract the knowledge triple to be included in the detailed knowledge graph from the common knowledge graph by using the knowledge graph modification model 2352.

The server 2000 may modify the extracted knowledge triple. The processor 2200 may modify at least one of node values corresponding to the nodes within the extracted knowledge triple or an edge value corresponding to the edge within the extracted knowledge triple. In this case, the server 2000 may modify the extracted knowledge triple by using the values output by the NLU model 2351 and the detailed knowledge graph. In this case, setup information about which part of the common knowledge graph is to be modified and how to modify a part of the common knowledge graph may be pre-stored in the storage 2300. In embodiments, the knowledge graph modification model 2352, which may be an AI model trained with which part of the common knowledge graph is to be modified and how to modify a part of the common knowledge graph, may be stored in the storage 2300, and the server 2000 may modify the common knowledge graph by using the knowledge graph modification mod& 2352. The server 2000 may extract a knowledge triple of which a node value or an edge value has been modified, from the common knowledge graph.

In operation S960, the server 2000 may modify the detailed knowledge graph. The server 2000 may delete some of the knowledge triples within the detailed knowledge graph. The server 2000 may delete, from the detailed knowledge graph, a knowledge triple that conflicts with the knowledge triple that is to be added. For example, the server 2000 may identify whether the knowledge triple to be added conflicts with the knowledge triples within the detailed knowledge graph, by using the common knowledge graph representing the properties of food ingredients. For example, the server 2000 may identify that 'Cheongyang pepper' within the knowledge triple including the node values 'Cheongyang pepper' and '2EA/1 serving' and the edge value 'amount' conflicts with 'onion' within the detailed knowledge graph. For example, the server 2000 may delete a knowledge triple including 'onion', 'amount', and '50 g' within the detailed knowledge graph.

The server 2000 may change values of some of the knowledge triples within the detailed knowledge graph. The server 2000 may change a knowledge triple having the values of similar properties to the properties of the knowledge triple that is to be added. For example, the processor 2200 may identify whether the knowledge triple to be added is similar to the knowledge triples within the detailed knowledge graph, by using the common knowledge graph representing the properties of food ingredients. For example, the processor 2200 may identify that 'Cheongyang pepper' within the knowledge triple including the node values 'Cheongyang pepper' and '2EA/1 serving' and the edge value 'amount' has a similar property to 'garlic' within the detailed knowledge graph. The processor 2200 may change, to '15 g', '20 g' in a knowledge triple including 'garlic', 'amount', and '20 g' within the detailed knowledge graph.

In embodiments, the server 2000 may change a knowledge triple having the values of properties conflicting with the properties of the knowledge triple that is to be added. For example, the server 2000 may identify that 'Cheongyang pepper' within the knowledge triple including the node values 'Cheongyang pepper' and '2EA/1 serving' and the edge value 'amount' conflicts with 'onion' within the detailed knowledge graph, and may change, to '25 g', '50 g' in a knowledge triple including 'onion', 'amount' and '50 g' within the detailed knowledge graph.

The server 2000 may change the node values within the detailed knowledge graph, by using the intention of the user interpreted by the NLU model 2351. For example, when the user wants a recipe for cooking a fish cake soup for two people and a detailed knowledge graph related to a fish cake soup recipe includes values for cooking a fish cake soup for one person, the server 2000 may change values indicating the amounts of ingredients within the detailed knowledge graph related to a fish cake soup recipe to values corresponding to cooking for two people.

The server 2000 may add the knowledge triple extracted from the common knowledge graph to the changed detailed knowledge graph. The server 2000 may connect a node of the knowledge graph extracted from the common knowledge graph to a node within the changed detailed knowledge graph.

In operation S970, the server 2000 may provide response information related to the inquiry of the user by using the modified detailed knowledge graph. The server 2000 may generate response information related to the text received from the device 1000. For example, the server 2000 may generate a response message that is for the user, by using the modified detailed knowledge graph and the NLG model 2353. For example, the server 2000 may obtain a response content that is to be provided to the user, such as text, an image, or a moving picture.

The server 2000 may provide the generated response message to the device 1000. In embodiments, the server 2000 may provide the modified detailed knowledge graph to the device 1000, and may allow the device 1000 to respond to the input of the user by using the modified detailed knowledge graph.

An embodiment of the disclosure may also be implemented as a recording medium including instructions executable by a computer, such as a program module executed by a computer. Computer-readable media may be any available media accessible by a computer and includes both volatile and nonvolatile media and removable and non-removable media. Computer-readable media may also include computer storage media. Computer storage media includes both volatile and nonvolatile, removable and non-removable media implemented in any method or technology for storage of information such as computer readable instructions, data structures, program modules or other data.

In addition, computer-readable storage media may be provided in the form of non-transitory storage media. Here, a 'non-transitory storage medium' is a tangible device and only means that it does not contain a signal (e.g., electromagnetic waves). This term does not distinguish a case in which data is stored semi-permanently in a storage medium from a case in which data is temporarily stored. For example, the 'non-transitory storage medium' may include a buffer in which data is temporarily stored.

According to an embodiment of the disclosure, a method according to various disclosed embodiments may be provided by being included in a computer program product. Computer program products are commodities and thus may be traded between sellers and buyers. Computer program products are distributed in the form of device-readable storage media (e.g., compact disc read only memory (CD-ROM)), or may be distributed (e.g., downloaded or uploaded) through an application store (e.g., Play Store™) or between two user devices (e.g., smartphones) directly and online. In the case of online distribution, at least a portion of the computer program product (e.g., a downloadable app) may be stored at least temporarily in a device-readable storage medium, such as a memory of a manufacturer's server, a server of an application store, or a relay server, or may be temporarily generated.

A term "unit" used herein may be a hardware component such as a processor or circuit, and/or a software component executed by a hardware component such as a processor.

An expression including at least one of a, b, or c" used herein means "including only a", "including only b", "including only c", "including a and b", "including b and c", "including a and c", or "including both a, b and c".

Functions related to AI according to the disclosure may be operated through or using a processor and a memory. The processor may include one processor or a plurality of processors. The one or plurality of processors may be a general-purpose processor such as a CPU, an AP, or a Digital Signal Processor (DSP), a graphics-only processor such as a GPU or a Vision Processing Unit (VPU), or an AI-only processor such as an NPU. The one or plurality of processors control to process input data, according to a predefined operation rule or AI model stored in the memory. In embodiments, when the one or plurality of processors are AI-only processors, the AI-only processors may be designed in a hardware structure specialized for processing a specific AI model.

The predefined operation rule or AI model may be characterized in that it is created through learning. Here, being made through learning means that a basic AI model is learned or taught using a plurality of learning data by a learning algorithm, so that a predefined operation rule or AI model set to perform desired characteristics (or a purpose) is created. Such learning may be performed in a device itself on which AI according to the disclosure is performed, or may be performed through a separate server and/or system. Examples of the learning algorithm include, but are not limited to, supervised learning, unsupervised learning, semi-supervised learning, or reinforcement learning.

The AI model may be composed of a plurality of neural network layers. Each of the plurality of neural network layers has a plurality of weight values, and performs a neural network operation through an operation between an operation result of a previous layer and the plurality of weight values. The plurality of weight values of the plurality of neural network layers may be optimized by the learning result of the AI model. For example, a plurality of weight values may be updated so that a loss value or a cost value obtained from the AI model is reduced or minimized during a learning process. The artificial neural network may include a deep neural network (DNN), for example, a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), or a Deep Q-Networks, but embodiments of the disclosure are not limited thereto.

Text received from a device according to the disclosure may be text converted from a user's voice input. In a method for recognizing the user's voice and interpreting the intention of the user, a user's voice signal, which may be an analog signal, may be converted into computer-readable text by an Automatic Speech Recognition (ASR) model. By interpreting the converted text using a Natural Language Understanding (NLU) model, a user's utterance intention may be obtained. The ASR model or the NLU model may be an AI model. The AI model may be processed by an AI-only processor designed with a hardware structure specialized for processing the AI model. The AI model may be created through learning. Here, being made through learning means that a basic AI model is learned or taught using a plurality of learning data by a learning algorithm, so that a predefined operation rule or AI model set to perform desired characteristics (or a purpose) is created. The AI model may be composed of or include a plurality of neural network layers. Each of the plurality of neural network layers has a plurality of weight values, and performs a neural network operation through an operation between an operation result of a previous layer and the plurality of weight values.

Linguistic understanding is a technology that recognizes and applies/processes human language/character, and thus includes natural language processing, machine translation, a dialog system, question answering, and speech recognition/speech recognition/synthesis, etc.

While the embodiments have been particularly shown and described herein, it will be understood that various changes in form and details may be made therein without departing from the spirit and scope of the disclosure. Thus, the above-described embodiments should be considered in descriptive sense only and not for purposes of limitation. For example, each component described as a single type may be implemented in a distributed manner, and similarly, components described as being distributed may be implemented in a combined form.

The scope of the disclosure is indicated by the scope of the claims to be described later rather than the above detailed description, and all changes or modified forms derived from the meaning and scope of the claims and the concept of equivalents thereof should be interpreted as being included in the scope of the disclosure.

The invention claimed is:

1. A method, performed by a server, of modifying a knowledge graph, the method comprising:

obtaining text related to an inquiry of a user;

providing the text to at least one natural language understanding (NLU) model to obtain an output value of the NLU model, the output value comprising an intent and a parameter related to detailed information of the intent;

identifying a service to be provided to the user based on the intent and the parameter by interpreting the text based on the output value of the NLU model;

based on the service being identified:

obtaining a detailed knowledge graph from among a plurality of detailed knowledge graphs related to the service;

identifying the parameter for providing the service based on a result of the interpreting, wherein the parameter relates to a modification of the service;

based on the parameter being identified, selecting a common knowledge graph related to the parameter from among a plurality of common knowledge graphs related to the service, wherein each of the plurality of common knowledge graphs is different from the detailed knowledge graph;

extracting a knowledge triple of the selected common knowledge graph related to the parameter;

selecting a knowledge triple of the detailed knowledge graph from among knowledge triples included in the detailed knowledge graph based on the extracted knowledge triple of the selected common knowledge graph;

modifying the detailed knowledge graph by updating the selected knowledge triple of the detailed knowledge graph based on the extracted first-knowledge triple of the selected common knowledge graph; and generating response information related to the inquiry of the user based on the modified detailed knowledge graph.

2. The method of claim 1, further comprising modifying the extracted knowledge triple of the selected common knowledge graph based on the output value of the NLU model, wherein the modifying of the detailed knowledge graph comprises adding the modified knowledge triple of the selected common knowledge graph to the detailed knowledge graph.

3. The method of claim 1, wherein the modifying of the detailed knowledge graph further comprises:

deleting the selected knowledge triple of the detailed knowledge graph from the detailed knowledge graph.

4. The method of claim 3, wherein the knowledge triple of the detailed knowledge graph has values that conflict with values corresponding to nodes and an edge included in the extracted knowledge triple of the selected common knowledge graph.

5. The method of claim 1, wherein the modifying of the detailed knowledge graph further comprises:

modifying values corresponding to nodes included in the knowledge triple of the detailed knowledge graph.

6. The method of claim 5, wherein the selecting of the knowledge triple of the detailed knowledge graph comprises selecting the knowledge triple of the detailed knowledge graph having values of properties that are same as values corresponding to nodes and an edge included in the extracted knowledge triple of the selected common knowledge graph.

7. The method of claim 1, wherein the modifying of the detailed knowledge graph comprises modifying the detailed knowledge graph by providing the output value of the NLU model, the detailed knowledge graph, and the selected common knowledge graph as inputs to an artificial intelligence (AI) model trained to modify the detailed knowledge graph.

8. The method of claim 1, wherein the parameter comprises at least one of an entity, a constraint type, or a constraint.

9. The method of claim 1, further comprising generating the response information related to the inquiry of the user using the modified detailed knowledge graph and a natural language generation (NLG) model.

10. The method of claim 1, further comprising transmitting the modified detailed knowledge graph to a device of the user in order to provide the service.

11. The method of claim 1, wherein each of the plurality of common knowledge graphs is commonly related to the plurality of detailed knowledge graphs.

12. A server for modifying a knowledge graph, the server comprising:

a communication interface;

a storage storing one or more instructions; and a processor configured to execute the one or more instructions to:

obtain text related to an inquiry of a user, provide the text to at least one natural language understanding (NLU) model to obtain an output value of the NLU model, the output value comprising an intent and a parameter related to detailed information of the intent, identify a service to be provided to the user based on the intent and the parameter by interpreting the text based on the output value of the NLU model, based on the service being identified:

obtain a detailed knowledge graph related to the service from among a plurality of detailed knowledge graphs, identify the parameter based on a result of the interpreting, wherein the parameter relates to a modification of the service, based on the parameter being identified, select a common knowledge graph related to the parameter from among a plurality of common knowledge graphs related to the service, wherein each of the plurality of common knowledge graphs is different from the detailed knowledge graph, extract a knowledge triple of the selected common knowledge graph related to the parameter from the selected common knowledge graph, select a knowledge triple of the detailed knowledge graph from among knowledge triples included in the detailed knowledge graph based on the extracted knowledge triple of the selected common knowledge graph;

modify the detailed knowledge graph by updating the selected knowledge triple of the detailed knowledge graph based on the extracted knowledge triple of the selected common knowledge graph, and generate response information related to the inquiry of the user based on the modified detailed knowledge graph.

13. The server of claim 12, wherein the processor is further configured to execute the one or more instructions to:

modify the extracted knowledge triple of the selected common knowledge graph based on the result of the interpreting, and add the modified knowledge triple of the selected common knowledge graph to the detailed knowledge graph.

14. The server of claim 12, wherein the processor is further configured to execute the one or more instructions to:

delete the selected knowledge triple of the detailed knowledge graph from the detailed knowledge graph.

15. The server of claim 14, wherein the knowledge triple of the detailed knowledge graph has values that conflict with values corresponding to nodes and an edge included in the extracted knowledge triple of the selected common knowledge graph.

16. A non-transitory computer-readable recording medium having recorded thereon instructions which, when executed by at least one processor of a device for modifying a knowledge graph, cause the device to:

obtain text related to an inquiry of a user;

provide the text to at least one natural language understanding (NLU) model to obtain an output value of the NLU model, the output value comprising an intent and a parameter related to detailed information of the intent;

identify a service to be provided to the user based on the intent and the parameter by interpreting the text based on the output value of the NLU model;

based on the service being identified:

obtain a detailed knowledge graph related to the service from among a plurality of detailed knowledge graphs;

identify the parameter for providing the service based on a result of the interpreting, wherein the parameter relates to a modification of the service;

based on the parameter being identified, select a common knowledge graph related to the parameter from among a plurality of common knowledge graphs related to the service, wherein each of the plurality of common knowledge graphs is different from the detailed knowledge graph;

extract a knowledge triple of the selected common knowledge graph related to the parameter from the selected common knowledge graph;

select a knowledge triple of the detailed knowledge graph from among knowledge triples included in the detailed knowledge graph based on the extracted knowledge triple of the selected common knowledge graph;

modify the detailed knowledge graph by updating the selected knowledge triple of the detailed knowledge graph based on the extracted first knowledge triple of the selected common knowledge graph; and generate response information related to the inquiry of the user based on the modified detailed knowledge graph.

* * * * *